United States Patent
Li et al.

(10) Patent No.: US 11,382,019 B2
(45) Date of Patent: Jul. 5, 2022

(54) SESSION MANAGEMENT METHOD AND APPARATUS, AND COMMUNICATIONS SYSTEM

(71) Applicant: HUAWEI TECHNOLOGIES CO., LTD., Shenzhen (CN)

(72) Inventors: Xiaojuan Li, Beijing (CN); Haorui Yang, Shenzhen (CN); Hui Jin, Beijing (CN); Guowei Ouyang, Beijing (CN); Fenghui Dou, Beijing (CN); Xiaoyan Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/976,730

(22) PCT Filed: May 29, 2018

(86) PCT No.: PCT/CN2018/088847
§ 371 (c)(1),
(2) Date: Aug. 28, 2020

(87) PCT Pub. No.: WO2019/165719
PCT Pub. Date: Sep. 6, 2019

(65) Prior Publication Data
US 2021/0007038 A1    Jan. 7, 2021

(30) Foreign Application Priority Data
Mar. 1, 2018  (WO) ................ PCT/CN2018/077800

(51) Int. Cl.
*H04W 36/32*    (2009.01)
*H04W 76/19*    (2018.01)
(Continued)

(52) U.S. Cl.
CPC ............. *H04W 36/32* (2013.01); *H04W 8/08* (2013.01); *H04W 36/0033* (2013.01);
(Continued)

(58) Field of Classification Search
CPC ........... H04W 8/08; H04W 8/14; H04W 8/24; H04W 36/0033; H04W 36/32;
(Continued)

(56) References Cited

U.S. PATENT DOCUMENTS 8,155,629 B2 *  4/2012  Gazzard ............ H04M 3/42348
                                                    455/414.1
9,674,830 B2    6/2017  Sun
(Continued)

FOREIGN PATENT DOCUMENTS

CN    106961747 A    7/2017
CN    107018542 A    8/2017
(Continued)

OTHER PUBLICATIONS

3GPP TS 23.502 V1.3.0 (Nov. 2017), 3rd Generation Partnership Project; Technical Specification Group Services and System Aspects; Procedures for the 5G System; Stage 2(Release 15), 215 pages.
(Continued)

*Primary Examiner* — Jean A Gelin
(74) *Attorney, Agent, or Firm* — Stein IP, LLC

(57) ABSTRACT

A session management method by a terminal in which a network initiates a session deactivation procedure to deactivate one or more sessions of a terminal. After the terminal in an inactive mode establishes an RRC connection to a new second base station, the second base station indicates, through RRC connection reconfiguration, the terminal to delete related information of the to-be-deactivated session, or the second base station uses an RRC connection resume response message to carry an identifier of the one or more
(Continued)

to-be-deactivated sessions, and the terminal deletes session-related information corresponding to the identifier of the one or more to-be-deactivated sessions. In this way, the terminal is enabled to process the related information of the to-be-deactivated session in a timely manner.

13 Claims, 24 Drawing Sheets

(51) Int. Cl.
    *H04W 76/36*     (2018.01)
    *H04W 76/27*     (2018.01)
    *H04W 8/08*     (2009.01)
    *H04W 36/00*     (2009.01)
    *H04W 48/16*     (2009.01)
    *H04W 68/00*     (2009.01)

(52) U.S. Cl.
    CPC ......... *H04W 48/16* (2013.01); *H04W 68/005* (2013.01); *H04W 76/19* (2018.02); *H04W 76/27* (2018.02); *H04W 76/36* (2018.02)

(58) Field of Classification Search
    CPC ... H04W 48/16; H04W 48/20; H04W 68/005; H04W 76/00; H04W 76/10; H04W 76/19; H04W 76/22; H04W 76/27; H04W 76/34; H04W 76/36; H04W 84/18; H04L 67/143; H04L 67/22
    See application file for complete search history.

(56) References Cited

U.S. PATENT DOCUMENTS

| | | | |
|---|---|---|---|
| 2010/0056184 A1* | 3/2010 | Vakil | H04W 52/0206 455/456.5 |
| 2011/0105116 A1* | 5/2011 | Kim | H04W 48/14 455/434 |
| 2018/0198867 A1* | 7/2018 | Dao | H04L 67/143 |
| 2018/0199355 A1* | 7/2018 | Wu | H04W 36/0022 |
| 2018/0343365 A1* | 11/2018 | Hirasawa | G06F 3/1231 |
| 2018/0343635 A1* | 11/2018 | Edge | G01S 5/0036 |
| 2019/0021129 A1* | 1/2019 | Gao | H04W 76/10 |
| 2019/0116517 A1* | 4/2019 | Liu | H04W 28/0268 |
| 2019/0141523 A1* | 5/2019 | Ben Henda | H04W 36/14 |
| 2019/0159025 A1* | 5/2019 | Ben Henda | H04W 36/14 |
| 2019/0166647 A1* | 5/2019 | Velev | H04W 76/12 |
| 2019/0274178 A1* | 9/2019 | Salkintzis | H04W 76/16 |
| 2019/0387401 A1* | 12/2019 | Liao | H04W 12/082 |
| 2019/0394698 A1* | 12/2019 | Jeong | H04W 36/08 |
| 2020/0015195 A1* | 1/2020 | Chong | H04W 68/06 |
| 2020/0022031 A1* | 1/2020 | Li | H04W 36/0022 |
| 2020/0100147 A1* | 3/2020 | Youn | H04W 36/14 |
| 2020/0275515 A1* | 8/2020 | Li | H04W 76/27 |
| 2020/0322857 A1* | 10/2020 | Park | H04W 36/00 |
| 2020/0404547 A1* | 12/2020 | Qiao | H04L 43/087 |
| 2020/0404732 A1* | 12/2020 | Shi | H04W 8/08 |
| 2021/0092707 A1* | 3/2021 | Ryu | H04W 8/24 |
| 2021/0211960 A1* | 7/2021 | Ryu | H04W 36/14 |

FOREIGN PATENT DOCUMENTS

| | | |
|---|---|---|
| WO | 2012153211 A1 | 11/2012 |
| WO | 2017118199 A1 | 7/2017 |

OTHER PUBLICATIONS

InterDigital Inc., UP deactivation for UE in inactive state. SA WG2 Meeting #S2-123, Oct. 23-27, 2017, Ljubljana, Slovania, S2-177290, 3 pages.

CATT, TS 23.502: N2 Context release for RRC inactive Ues. SA WG2 Meeting #123, Oct. 23 27, 2017, Ljubljana, Slovenia, S2-177927, 4 pages.

Ericsson, Alignment of terminology and general cleanup. 3GPP TSG-SA WG2 Meeting #126, Feb. 26-Mar. 2, 2018, Montreal, Canada, S2-182630, 103 pages.

3GPP TS 23.502 V15.0 0 (Dec. 2017);3rd Generation Partnership Project;Technical Specification Group Services and System Aspects;Procedures for the 5G System;Stage 2(Release 15);Total 257 pages.

S2-178120 CATT, "TS 23.501: N2 Context release for RRC inactive UEs", SA WG2 Meeting #123, Oct. 23 27, 2017, Ljubljana, Slovenia,total 2 pages.

S2-170315 CATT, "PDU session release procedure in home routed roaming case",SA WG2 Meeting #118-BIS,Jan. 16-20, 2017 Spokane, WA, USA,total 3 pages.

S2-178122 CATT, "TS 23.502: N2 Context release for RRC inactive UEs",SA WG2 Meeting #123,Oct. 23 27, 2017, Ljubljana, Slovenia,total 4 pages.

* cited by examiner

SESSION MANAGEMENT METHOD AND APPARATUS, AND COMMUNICATIONS SYSTEM

CROSS-REFERENCE TO RELATED APPLICATIONS

This application is a National Stage of International Application No. PCT/CN2018/088847, filed on May 29, 2018, which claims priority to International Application No. PCT/CN2018/077800, filed on Mar. 1, 2018, both of which are hereby incorporated by reference in their entireties.

TECHNICAL FIELD

Aspects of this application relate to the field of communications technologies, and in particular, to a session management method and apparatus, and a communications system.

BACKGROUND

When a terminal is in a connected mode, if a user plane function (UPF) entity detects that no data is transmitted in a protocol data unit (PDU) session within an inactivity timer (inactivity period timer), the user plane function entity notifies a session management function (SMF) entity to perform a PDU session deactivation ( ) procedure. FIG. 1 is a schematic diagram of a session deactivation procedure performed when a terminal is in a connected mode. In this procedure, an access and mobility management function (AMF) entity sends an N2 PDU session resource release command to a new generation-radio access network (NG-RAN) (step 4 in FIG. 1). After receiving the command, the NG-RAN sends a RAN-specific resource release message such as a radio resource control (RRC) connection reconfiguration message to the terminal, to notify the terminal to release related information of the session, for example, a session identifier and a data radio bearer (DRB) (step 5 in FIG. 1). In addition, the NG-RAN locally releases the related information of the session.

SUMMARY

Aspects of this application provide a session management method and apparatus, and a communications system, to process related information of a deactivated session in a timely manner when a terminal is in an RRC inactive mode.

According to a first aspect, a session management method is provided, including: receiving, by a first base station, a session resource release command from an access and mobility management network element AMF, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by the first base station, a context retrieval request message from a second base station; sending, by the first base station, a context retrieval response message to the second base station, where the context retrieval response message includes the N2 SM info; and sending, by the first base station, a session resource release success response message to the AMF.

In this aspect, after receiving the session resource release command from the access and mobility management function, the old first base station sends the N2 interface session management related information to the new second base station through the context response message. After the terminal in the inactive mode establishes an RRC connection to the second base station, the second base station indicates, through RRC connection reconfiguration, the terminal to delete related information of the to-be-deactivated session, or the second base station uses an RRC connection resume response message to carry the identifier of the one or more to-be-deactivated sessions, and the terminal deletes session-related information corresponding to the identifier of the one or more to-be-deactivated sessions. In this way, the terminal is enabled to process the related information of the to-be-deactivated session in a timely manner.

With reference to the first aspect, in a first possible implementation, before the sending, by the first base station, a context retrieval response message to the second base station, the method further includes: parsing, by the first base station, the N2 SM info, to obtain the identifier of the one or more to-be-deactivated sessions.

With reference to the first possible implementation of the first aspect, in a second possible implementation, the sending, by the first base station, a context retrieval response message to the second base station includes: sending, by the first base station, the context retrieval response message to the second base station, so that the second base station performs RRC connection reconfiguration on the terminal to reconfigure related information of the to-be-deactivated session, or the second base station sends an RRC connection resume response message to the terminal, where the RRC connection resume response message includes the identifier of the one or more to-be-deactivated sessions, and the terminal deletes session-related information corresponding to the one or more to-be-deactivated sessions.

With reference to the first aspect or the first possible implementation of the first aspect, in a third possible implementation, before the sending, by the first base station, a context retrieval response message to the second base station, the method further includes: deleting, by the first base station, related information of the one or more to-be-deactivated sessions from the context, where the related information includes at least the identifier of the one or more sessions and DRB information of the one or more sessions.

With reference to the first aspect, the first possible implementation of the first aspect, the second possible implementation of the first aspect, or the third possible implementation of the first aspect, in a fourth possible implementation, before the receiving, by the first base station, a context retrieval request message from the second base station, the method further includes: sending, by the first base station, a paging message to the terminal.

According to a second aspect, a session management method is provided, including: receiving, by a second base station, a radio resource control RRC connection resume request message from a terminal; sending, by the second base station, a context retrieval request message to a first base station; receiving, by the second base station, a context retrieval response message from the first base station, where the context retrieval response message includes N2 interface session management related information (N2 SM info), and the N2 SM info includes an identifier of one or more to-be-deactivated sessions of the terminal; sending, by the second base station, an RRC connection resume response message to the terminal; sending, by the second base station, an RRC connection reconfiguration message to the terminal, where the RRC connection reconfiguration message is used to indicate to reconfigure related information of the to-bedeactivated session; and receiving, by the second base station, an RRC connection reconfiguration response message from the terminal.

In this aspect, after the terminal in an inactive mode establishes an RRC connection to the new second base station, the second base station indicates, through RRC connection reconfiguration, the terminal to delete the related information of the to-be-deactivated session. In this way, the terminal is enabled to process the related information of the to-be-deactivated session in a timely manner.

With reference to the second aspect, in a first possible implementation, the context retrieval response message further includes a context of the terminal, and after the receiving, by the second base station, a context retrieval response message from the first base station, the method further includes: modifying, by the second base station, the context of the terminal based on the N2 SM info, to delete the related information of the one or more to-be-deactivated sessions from the context of the terminal.

With reference to the second aspect, in a second possible implementation, after the receiving, by the second base station, a context retrieval response message from the first base station, the method further includes: sending, by the second base station, a path switch request message to an access and mobility management network element AMF; and receiving, by the second base station, a path switch response message from the AMF.

With reference to the second possible implementation of the second aspect, in a third possible implementation, after the sending, by the second base station, an RRC connection reconfiguration message to the terminal, the method further includes: sending, by the second base station, a session resource release response message to the AMF.

According to a third aspect, a session management method is provided, including: receiving, by a second base station, a radio resource control RRC connection resume request message from a terminal; sending, by the second base station, a context retrieval request message to a first base station; receiving, by the second base station, a context retrieval response message from the first base station, where the context retrieval response message includes a context of the terminal and an identifier of one or more to-be-deactivated sessions of the terminal; and sending, by the second base station, an RRC connection resume response message to the terminal, where the RRC connection resume message includes the identifier of the one or more to-be-deactivated sessions of the terminal.

In this aspect, after the terminal in an inactive mode establishes an RRC connection to the second base station, the second base station uses the RRC connection resume response message to carry the identifier of the one or more to-be-deactivated sessions, and the terminal deletes session-related information corresponding to the identifier of the one or more to-be-deactivated sessions. In this way, the terminal is enabled to process the related information of the to-be-deactivated session in a timely manner.

With reference to the third aspect, in a first possible implementation, the sending, by the second base station, an RRC connection resume response message to the terminal includes: sending, by the second base station, the RRC connection resume response message to the terminal, so that the terminal deletes session-related information corresponding to the identifier of the one or more to-be-deactivated sessions.

With reference to the third aspect or the first possible implementation of the third aspect, in a second possible implementation, before the receiving, by a second base station, an RRC connection resume request message from a terminal, the method further includes: sending, by the second base station, a paging message to the terminal.

According to a fourth aspect, a session management method is provided, including: receiving, by a terminal, a paging message from each of a first base station and a second base station, where the terminal is in an inactive mode; sending, by the terminal, a radio resource control RRC connection resume request message to the second base station; receiving, by the terminal, an RRC connection resume response message from the second base station, where the RRC connection resume response message includes N2 interface session management related information (N2 SM info) or an identifier of one or more to-be-deactivated sessions of the terminal, and the N2 SM info includes the identifier of the one or more to-be-deactivated sessions of the terminal; and deleting, by the terminal, session-related information corresponding to the identifier of the one or more to-be-deactivated sessions.

In this aspect, after the terminal in the inactive mode establishes an RRC connection to the second base station, the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

According to a fifth aspect, a session management method is provided, including: receiving, by a terminal, a paging message from each of a first base station and a second base station, where the terminal is in an inactive mode; sending, by the terminal, a radio resource control RRC connection resume request message to the second base station; receiving, by the terminal, an RRC connection resume response message from the second base station; receiving, by the terminal, an RRC connection reconfiguration message from the second base station, where the RRC connection reconfiguration message is used to indicate to reconfigure related information of a to-be-deactivated session; and sending, by the terminal, an RRC connection reconfiguration response message to the second base station.

In this aspect, after the terminal in the inactive mode establishes an RRC connection to the new second base station, the second base station indicates, through RRC connection reconfiguration, the terminal to delete the related information of the to-be-deactivated session. In this way, the terminal is enabled to process the related information of the to-be-deactivated session in a timely manner.

According to a sixth aspect, a session management method is provided, including: receiving, by a second base station, a radio resource control RRC connection resume request message from a terminal; sending, by the second base station, a context retrieval request message to a first base station; receiving, by the second base station, a context retrieval response from the first base station, where the context retrieval response message includes a context of the terminal; sending, by the second base station, an RRC connection resume response message to the terminal; receiving, by the second base station, a session resource release command from an access and mobility management function, where the session resource release command includes N2 interface session management related information (N2 SM info), and the N2 SM info includes an identifier of one or more to-be-deactivated sessions of the terminal; sending, by the second base station, an RRC connection reconfiguration message to the terminal, where the RRC connection reconfiguration message is used to indicate to reconfigure a data radio bearer DRB of the terminal and delete related information of the one or more to-be-deactivated sessions; receiving, by the second base station, an RRC connection reconfiguration response message from the terminal; and sending, by the second base station, a session resource release success response message to the access and mobility management function.

In this aspect, a network initiates a session deactivation procedure to deactivate the one or more sessions of the terminal. The old first base station cannot perform RRC connection reconfiguration with the terminal to delete the related information of the one or more to-be-deactivated sessions, but returns a session resource release failure response message to the access and mobility management function. The access and mobility management function resends the session resource release command to the new second base station. The new second base station performs RRC connection reconfiguration with the terminal. In this way, the terminal is enabled to process the related information of the to-be-deactivated session in a timely manner.

With reference to the sixth aspect, in a first possible implementation, after the receiving, by the second base station, a context retrieval response from the first base station, and before the sending, by the second base station, an RRC connection resume response message to the terminal, the method further includes: sending, by the second base station, a path switch request message to the access and mobility management function; and receiving, by the second base station, a path switch response message from the AMF.

According to a seventh aspect, a session management method is provided, including: receiving, by a first base station, a session resource release command from an access and mobility management function, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by the first base station, a context retrieval request message from a second base station after the terminal sends a radio resource control RRC connection resume request message to the second base station; sending, by the first base station, a context retrieval response message to the second base station, where the context retrieval response includes a context of the terminal; and sending, by the first base station, a session resource release failure response message to the access and mobility management function, where the session resource release failure response message includes an identifier of the second base station.

In this aspect, a network initiates a session deactivation procedure to deactivate the one or more sessions of the terminal. The old first base station cannot perform RRC connection reconfiguration with the terminal to delete related information of the one or more to-be-deactivated sessions, but returns the session resource release failure response message to the access and mobility management function. The access and mobility management function resends a session resource release command to the new second base station. The new second base station performs RRC connection reconfiguration with the terminal. In this way, the terminal is enabled to process the related information of the to-be-deactivated session in a timely manner.

With reference to the seventh aspect, in a first possible implementation, the sending, by the first base station, a session resource release failure response message to the access and mobility management function includes: sending, by the first base station, the session resource release failure response message to the access and mobility management function, so that the access and mobility management function sends a session resource release command to the second base station, where the session resource release command includes the N2 SM info, the second base station sends an RRC connection reconfiguration message to the terminal, and the RRC connection reconfiguration message is used to indicate to reconfigure related information of the to-be-deactivated session.

In another embodiment, a session management method is further provided, including: receiving, by a first base station, a session resource release command from an access and mobility management function, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by the first base station, a context retrieval request message from a second base station after the terminal sends a radio resource control RRC connection resume request message to the second base station; sending, by the first base station, a context retrieval response message to the second base station, where the context retrieval response includes a context of the terminal; and sending, by the first base station, a session resource release response message to the access and mobility management function, where the session resource release response message includes a cause value, and the cause value is used to indicate that the first base station fails to deactivate the one or more sessions of the terminal.

According to an eighth aspect, a session management apparatus is provided, including a receiving unit, a processing unit, and a sending unit. The receiving unit is configured to receive a session resource release command from an access and mobility management network element AMF, where the session resource release command includes N2 interface session management related information (N2 SM info), and the N2 SM info includes an identifier of one or more to-be-deactivated sessions of a terminal. The processing unit is configured to determine that the terminal is in an inactive mode. The receiving unit is further configured to receive a context retrieval request message from a second base station. The sending unit is configured to send a context retrieval response message to the second base station, where the context retrieval response message includes the N2 SM info. The sending unit is further configured to send a session resource release success response message to the AMF.

With reference to the eighth aspect, in a first possible implementation, the processing unit is further configured to parse the N2 SM info, to obtain the identifier of the one or more to-be-deactivated sessions.

With reference to the first possible implementation of the eighth aspect, in a second possible implementation, the sending unit is further configured to send the context retrieval response message to the second base station, so that the second base station performs RRC connection reconfiguration on the terminal to reconfigure related information of the to-be-deactivated session, or the second base station sends an RRC connection resume response message to the terminal, where the RRC connection resume response message includes the identifier of the one or more to-be-deactivated sessions, and the terminal deletes session-related information corresponding to the one or more to-be-deactivated sessions.

With reference to the eighth aspect or the first possible implementation of the eighth aspect, in a third possible implementation, the processing unit is further configured to delete related information of the one or more to-be-deactivated sessions from the context, where the related information includes at least the identifier of the one or more sessions and DRB information of the one or more sessions.

With reference to the eighth aspect, the first possible implementation of the eighth aspect, the second possible implementation of the eighth aspect, or the third possible implementation of the eighth aspect, in a fourth possible implementation, the sending unit is further configured to send a paging message to the terminal.

According to a ninth aspect, a session management apparatus is provided, including a receiving unit, a sending unit, and a processing unit. The receiving unit is configured to receive a radio resource control RRC connection resume request message from a terminal. The sending unit is configured to send a context retrieval request message to a first base station. The receiving unit is further configured to receive a context retrieval response message from the first base station, where the context retrieval response message includes N2 interface session management related information (N2 SM info), and the N2 SM info includes an identifier of one or more to-be-deactivated sessions of the terminal. The sending unit is further configured to send an RRC connection resume response message to the terminal. The sending unit is further configured to send an RRC connection reconfiguration message to the terminal, where the RRC connection reconfiguration message is used to indicate to reconfigure related information of the to-be-deactivated session. The receiving unit is further configured to receive an RRC connection reconfiguration response message from the terminal.

With reference to the ninth aspect, in a first possible implementation, the context retrieval response message further includes a context of the terminal, and the processing unit is further configured to modify the context of the terminal based on the N2 SM info, to delete the related information of the one or more to-be-deactivated sessions from the context of the terminal.

According to a tenth aspect, a session management apparatus is provided, including a receiving unit and a sending unit. The receiving unit is configured to receive a radio resource control RRC connection resume request message from a terminal. The sending unit is configured to send a context retrieval request message to a first base station. The receiving unit is further configured to receive a context retrieval response message from the first base station, where the context retrieval response message includes a context of the terminal and an identifier of one or more to-be-deactivated sessions of the terminal. The sending unit is further configured to send an RRC connection resume response message to the terminal, where the RRC connection resume response message includes the identifier of the one or more to-be-deactivated sessions of the terminal.

In a first possible implementation, the sending unit is further configured to send the RRC connection resume response message to the terminal, so that the terminal deletes session-related information corresponding to the identifier of the one or more to-be-deactivated sessions.

With reference to the tenth aspect or the first possible implementation of the tenth aspect, in a second possible implementation, the sending unit is further configured to send a paging message to the terminal.

According to an eleventh aspect, a session management apparatus is provided, including a receiving unit, a sending unit, and a processing unit. The receiving unit is configured to receive a paging message from each of a first base station and a second base station, where the session management apparatus is in an inactive mode. The sending unit is configured to send a radio resource control RRC connection resume request message to the second base station. The receiving unit is further configured to receive an RRC connection resume response message from the second base station, where the RRC connection resume response message includes N2 interface session management related information (N2 SM info) or an identifier of one or more to-be-deactivated sessions of the terminal, and the N2 SM info includes the identifier of the one or more to-be-deactivated sessions of the terminal. The processing unit is configured to delete session-related information corresponding to the identifier of the one or more to-be-deactivated sessions.

According to a twelfth aspect, a session management apparatus is provided, including a receiving unit and a sending unit. The receiving unit is configured to receive a paging message from each of a first base station and a second base station, where the session management apparatus is in an inactive mode. The sending unit is configured to send a radio resource control RRC connection resume request message to the second base station. The receiving unit is further configured to receive an RRC connection resume response message from the second base station. The receiving unit is further configured to receive an RRC connection reconfiguration message from the second base station, where the RRC connection reconfiguration message is used to indicate to reconfigure related information of a to-be-deactivated session. The sending unit is further configured to send an RRC connection reconfiguration response message to the second base station.

According to a thirteenth aspect, a session management apparatus is provided, including a receiving unit and a sending unit. The receiving unit is configured to receive a radio resource control RRC connection resume request message from a terminal. The sending unit is configured to send a context retrieval request message to a first base station. The receiving unit is further configured to receive a context retrieval response from the first base station, where the context retrieval response message includes a context of the terminal. The sending unit is further configured to send an RRC connection resume response message to the terminal. The receiving unit is further configured to receive a session resource release command from an access and mobility management function, where the session resource release command includes N2 interface session management related information (N2 SM info), and the N2 SM info includes an identifier of one or more to-be-deactivated sessions of the terminal. The sending unit is further configured to send an RRC connection reconfiguration message to the terminal, where the RRC connection reconfiguration message is used to indicate to reconfigure a data radio bearer DRB of the terminal and delete related information of the one or more to-be-deactivated sessions. The receiving unit is further configured to receive an RRC connection reconfiguration response message from the terminal. The sending unit is further configured to send a session resource release success response message to the access and mobility management function.

According to a fourteenth aspect, a session management apparatus is provided, including a receiving unit, a processing unit, and a sending unit. The receiving unit is configured to receive a session resource release command from an access and mobility management function, where the session resource release command includes N2 interface session management related information (N2 SM info), and the N2 SM info includes an identifier of one or more to-be-deactivated sessions of a terminal. The processing unit is configured to determine that the terminal is in an inactive mode. The receiving unit is further configured to receive a context retrieval request message from a second base station after the terminal sends a radio resource control RRC connection resume request message to the second base station. The sending unit is configured to send a context retrieval response message to the second base station, where the context retrieval response includes a context of the terminal. The sending unit is further configured to send a session resource release failure response message to the access and mobility management function, where the session resource release failure response message includes an identifier of the second base station.

In a first possible implementation, the sending unit is further configured to send the session resource release failure response message to the access and mobility management function, so that the access and mobility management function sends a session resource release command to the second base station, where the session resource release command includes the N2 SM info, the second base station sends an RRC connection reconfiguration message to the terminal, and the RRC connection reconfiguration message is used to indicate to reconfigure related information of the to-be-deactivated session.

According to a fifteenth aspect, a session management apparatus is provided, including a receiver, a transmitter, a processor, and a memory, where the processor is coupled to the memory, the memory is configured to store a program, and the processor invokes the program stored in the memory, to perform the method in the first aspect. The session management apparatus may be a first base station, or may be at least one processing element or chip.

According to a sixteenth aspect, a session management apparatus is provided, including a receiver, a transmitter, a processor, and a memory, where the processor is coupled to the memory, the memory is configured to store a program, and the processor invokes the program stored in the memory, to perform the method in the second aspect. The session management apparatus may be a second base station, or may be at least one processing element or chip.

According to a seventeenth aspect, a session management apparatus is provided, including a receiver, a transmitter, a processor, and a memory, where the processor is coupled to the memory, the memory is configured to store a program, and the processor invokes the program stored in the memory, to perform the method in the third aspect. The session management apparatus may be a second base station, or may be at least one processing element or chip.

According to an eighteenth aspect, a session management apparatus is provided, including a receiver, a transmitter, a processor, and a memory, where the processor is coupled to the memory, the memory is configured to store a program, and the processor invokes the program stored in the memory, to perform the method in the fourth aspect. The session management apparatus may be a terminal, or may be at least one processing element or chip.

According to a nineteenth aspect, a session management apparatus is provided, including a receiver, a transmitter, a processor, and a memory, where the processor is coupled to the memory, the memory is configured to store a program, and the processor invokes the program stored in the memory, to perform the method in the fifth aspect. The session management apparatus may be a terminal, or may be at least one processing element or chip.

According to a twentieth aspect, a session management apparatus is provided, including a receiver, a transmitter, a processor, and a memory, where the processor is coupled to the memory, the memory is configured to store a program, and the processor invokes the program stored in the memory, to perform the method in the sixth aspect. The session management apparatus may be a second base station, or may be at least one processing element or chip.

According to a twenty-first aspect, a session management apparatus is provided, including a receiver, a transmitter, a processor, and a memory, where the processor is coupled to the memory, the memory is configured to store a program, and the processor invokes the program stored in the memory, to perform the method in the seventh aspect. The session management apparatus may be a first base station, or may be at least one processing element or chip.

According to a twenty-second aspect, a session management method is provided, including: receiving, by a first base station, a session resource release command from an access and mobility management network element AMF, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by the terminal, a paging message; sending, by the terminal, a radio resource control RRC connection resume request message to a second base station; sending, by the second base station, a context retrieval request message to the first base station; sending, by the first base station, a context retrieval response message to the second base station, where the context retrieval response message includes a context of the terminal and the N2 SM info; sending, by the second base station, an RRC connection resume response message to the terminal, where the RRC connection resume response message includes the identifier of the one or more to-be-deactivated sessions; deleting, by the terminal, session-related information corresponding to the identifier of the one or more to-be-deactivated sessions; and sending, by the first base station, a session resource release success response message to the access and mobility management function.

With reference to the twenty-second aspect, in a first possible implementation, before the sending, by the first base station, a context retrieval response message to the second base station, the method further includes: modifying, by the first base station, the context of the terminal based on the N2 SM info, to delete the related information of the one or more to-be-deactivated sessions from the context of the terminal.

With reference to the twenty-second aspect or the first possible implementation of the twenty-second aspect, in a second possible implementation, after the sending, by the first base station, a context retrieval response message to the second base station, the method further includes: modifying, by the second base station, the context of the terminal based on the N2 SM info, to delete the related information of the one or more to-be-deactivated sessions from the context of the terminal.

According to a twenty-third aspect, a session management method is provided, including: receiving, by a first base station, a session resource release command from an access and mobility management network element AMF, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by a second base station, a radio resource control RRC connection resume request message sent by the terminal; sending, by the second base station, a context retrieval request message to the first base station; sending, by the first base station, a context retrieval response message to the second base station, where the context retrieval response message includes a context of the terminal and the N2 SM info; sending, by the second base station, an RRC connection resume response message to the terminal; sending, by the second base station, an RRC connection reconfiguration message to the terminal, where the RRC connection reconfiguration message is used to indicate to reconfigure related information of the to-be-deactivated session; receiving, by the second base station, an RRC connection reconfiguration response message sent by the terminal; and sending, by the first base station, a session resource release success response message to the AMF.

With reference to the twenty-third aspect, in a first possible implementation, before the sending, by the first base station, a context retrieval response message to the second base station, the method further includes: modifying, by the first base station, the context of the terminal based on the N2 SM info, to delete the related information of the one or more to-be-deactivated sessions from the context of the terminal.

With reference to the twenty-third aspect or the first possible implementation of the twenty-third aspect, in a second possible implementation, after the sending, by the first base station, a context retrieval response message to the second base station, the method further includes: modifying, by the second base station, the context of the terminal based on the N2 SM info, to delete the related information of the one or more to-be-deactivated sessions from the context of the terminal.

According to a twenty-fourth aspect, a communications system is provided, including a first base station, a second base station, and a terminal. The first base station is configured to receive a session resource release command from an access and mobility management network element AMF, where the session resource release command includes N2 interface session management related information (N2 SM info), and the N2 SM info includes an identifier of one or more to-be-deactivated sessions of the terminal. The first base station is further configured to determine that the terminal is in an inactive mode. The terminal is configured to receive a paging message. The terminal is further configured to send a radio resource control RRC connection resume request message to the second base station. The second base station is configured to send a context retrieval request message to the first base station. The first base station is further configured to send a context retrieval response message to the second base station, where the context retrieval response message includes a context of the terminal and the N2 SM info. The second base station is further configured to send an RRC connection resume response message to the terminal, where the RRC connection resume response message includes the identifier of the one or more to-be-deactivated sessions. The terminal is further configured to delete session-related information corresponding to the identifier of the one or more to-be-deactivated sessions. The first base station is further configured to send a session resource release success response message to the access and mobility management function.

With reference to the twenty-fourth aspect, in a first possible implementation, the first base station is further configured to modify the context of the terminal based on the N2 SM info, to delete the related information of the one or more to-be-deactivated sessions from the context of the terminal.

With reference to the twenty-fourth aspect, in a second possible implementation, the second base station is further configured to modify the context of the terminal based on the N2 SM info, to delete the related information of the one or more to-be-deactivated sessions from the context of the terminal.

According to a twenty-fifth aspect, a communications system is provided, including a first base station and a second base station. The first base station is configured to receive a session resource release command from an access and mobility management network element AMF, where the session resource release command includes N2 interface session management related information (N2 SM info), and the N2 SM info includes an identifier of one or more to-be-deactivated sessions of a terminal. The first base station is further configured to determine that the terminal is in an inactive mode. The second base station is configured to receive a radio resource control RRC connection resume request message sent by the terminal. The second base station is further configured to send a context retrieval request message to the first base station. The first base station is further configured to send a context retrieval response message to the second base station, where the context retrieval response message includes a context of the terminal and the N2 SM info. The second base station is further configured to send an RRC connection resume response message to the terminal. The second base station is further configured to send an RRC connection reconfiguration message to the terminal, where the RRC connection reconfiguration message is used to indicate to reconfigure related information of the to-be-deactivated session. The second base station is further configured to receive an RRC connection reconfiguration response message sent by the terminal. The first base station is further configured to send a session resource release success response message to the AMF.

With reference to the twenty-fifth aspect, in a first possible implementation, the first base station is further configured to modify the context of the terminal based on the N2 SM info, to delete the related information of the one or more to-be-deactivated sessions from the context of the terminal.

With reference to the twenty-fifth aspect, in a second possible implementation, the second base station is further configured to modify the context of the terminal based on the N2 SM info, to delete the related information of the one or more to-be-deactivated sessions from the context of the terminal.

According to a twenty-sixth aspect, a session management method is provided, including: receiving, by a first base station, a session resource release command from an access and mobility management function, where the session resource release command includes N2 interface session management related information (N2 SM info), and the N2 SM info includes an identifier of one or more to-be-deactivated sessions of a terminal; determining, by the first base station, that the terminal is in an inactive mode; receiving, by a second base station, a radio resource control RRC connection resume request message from the terminal; sending, by the second base station, a context retrieval request message to the first base station; sending, by the first base station, a context retrieval response message to the second base station, where the context retrieval response message includes a context of the terminal; sending, by the first base station, a session resource release failure response message to the access and mobility management function, where the session resource release failure response message includes an identifier of the second base station; sending, by the second base station, an RRC connection resume response message to the terminal; receiving, by the second base station, a session resource release command from the access and mobility management function, where the session resource release command includes the N2 SM info; sending, by the second base station, an RRC connection reconfiguration message to the terminal, where the RRC connection reconfiguration message is used to indicate to reconfigure related information of the to-be-deactivated session; receiving, by the second base station, an RRC connection reconfiguration response message from the terminal; and sending, by the second base station, a session resource release success response message to the access and mobility management function.

According to a twenty-sixth aspect, a communications system is provided, including a first base station and a second base station. The first base station is configured to receive a session resource release command from an access and mobility management function, where the session resource release command includes N2 interface session management related information (N2 SM info), and the N2 SM info includes an identifier of one or more to-be-deactivated sessions of a terminal. The first base station is further configured to determine that the terminal is in an inactive mode. The second base station is configured to receive a radio resource control RRC connection resume request message from the terminal. The second base station is further configured to send a context retrieval request message to the first base station. The first base station is further configured to send a context retrieval response message to the second base station, where the context retrieval response message includes a context of the terminal. The first base station is further configured to send a session resource release failure response message to the access and mobility management function, where the session resource release failure response message includes an identifier of the second base station. The second base station is further configured to send an RRC connection resume response message to the terminal. The second base station is further configured to receive a session resource release command from the access and mobility management function, where the session resource release command includes the N2 SM info. The second base station is further configured to send an RRC connection reconfiguration message to the terminal, where the RRC connection reconfiguration message is used to indicate to reconfigure related information of the to-be-deactivated session. The second base station is further configured to receive an RRC connection reconfiguration response message from the terminal. The second base station is further configured to send a session resource release success response message to the access and mobility management function.

According to a twenty-seventh aspect, a computer readable storage medium is provided. The computer readable storage medium stores an instruction, and when the instruction is run on a computer, the computer is enabled to perform the methods in the foregoing aspects.

According to a twenty-eighth aspect, a program is provided. When being executed by a processor, the program is used to perform the method according to any one of the first aspect to the seventh aspect or the possible implementations of any one of the first aspect to the seventh aspect.

BRIEF DESCRIPTION OF DRAWINGS

The following briefly describes the accompanying drawings required for the background or embodiments.

FIG. 7A-1 and FIG. 7A-2 are schematic interaction flowcharts of a session management method in another example communication scenario according to an embodiment of this application;

FIG. 7B-1 and FIG. 7B-2 are schematic interaction flowcharts of a session management method in still another example communication scenario according to an embodiment of this application;

FIG. 8A-1 and FIG. 8A-2 are schematic interaction flowcharts of still another session management method according to an embodiment of this application;

FIG. 8B-1 and FIG. 8B-2 are schematic interaction flowcharts of still another session management method according to an embodiment of this application;

DESCRIPTION OF EMBODIMENTS

The following describes the technical solutions in the embodiments of this application with reference to the accompanying drawings in the embodiments of this application.

Figure 2:
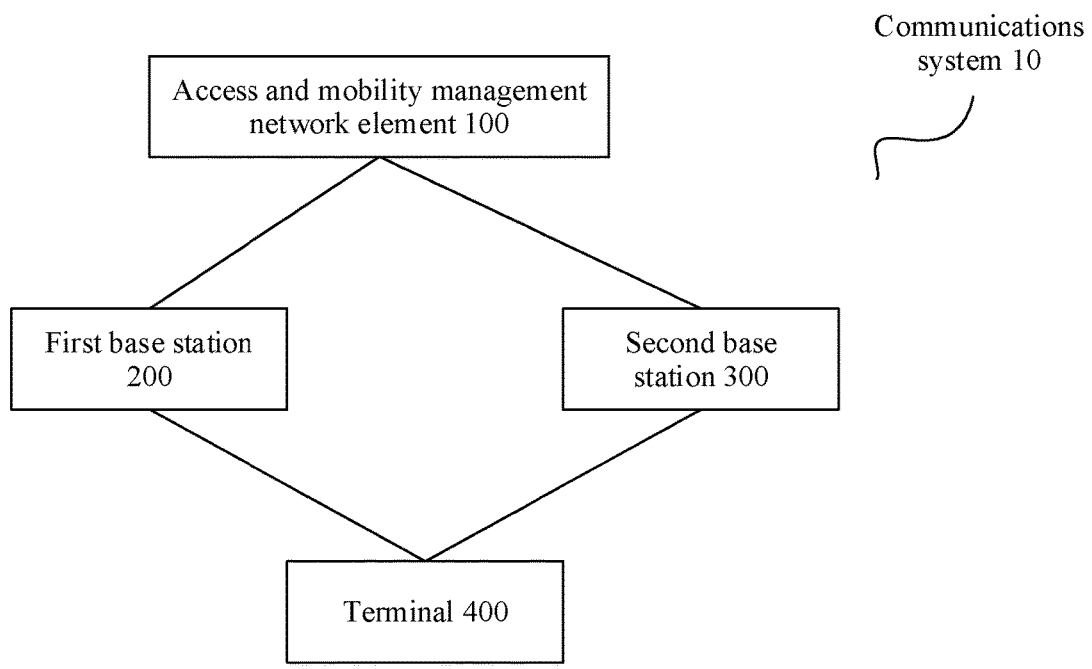
FIG. 2 is a schematic diagram of a communications system according to an embodiment of this application.

An embodiment of this application provides a communications system. FIG. 2 is a schematic diagram of a communications system according to an embodiment of this application. The communications system 10 may include an access and mobility management network element 100, a first base station 200, a second base station 300, and a terminal 400. The terminal 400 is connected to the first base station 200 or the second base station 300, and the first base station 200 and the second base station 300 are connected to the access and mobility management network element 100. The terminal is in an RRC inactive mode. To be specific, the terminal is in an idle mode relative to the first base station 200, and the first base station 200 is connected to a core network (through an N2/N3 interface). Then, the terminal 400 establishes an RRC connection to the second base station 300 through a paging procedure. After interaction among the access and mobility management network element 100, the first base station 200, the second base station 300, and the terminal 400, the second base station 300 indicates, through RRC connection reconfiguration, to reconfigure related information of the to-be-deactivated session, or the terminal deletes session-related information corresponding to an identifier of one or more to-be-deactivated sessions. In this way, the related information of the to-be-deactivated session of the terminal is processed in a timely manner, so that data transmission reliability is ensured. It should be noted that the access and mobility management network element is merely a name and is configured to manage access and mobility of the terminal, and the name does not constitute a limitation on the entity. For example, the access and mobility management network element may be replaced with an "access and mobility management function" or have another name. In addition, the access and mobility management network element may correspond to a network element that includes another function in addition to an access and mobility management function. "First and second" in the first base station and the second base station are merely used for differentiation, and are not used as any limitation. A description is provided herein, and details are not described below again.

In this application, the related information of the session includes an identifier of the session, a data radio bearer (DRB) of the session, and other related information.

Figure 3A:
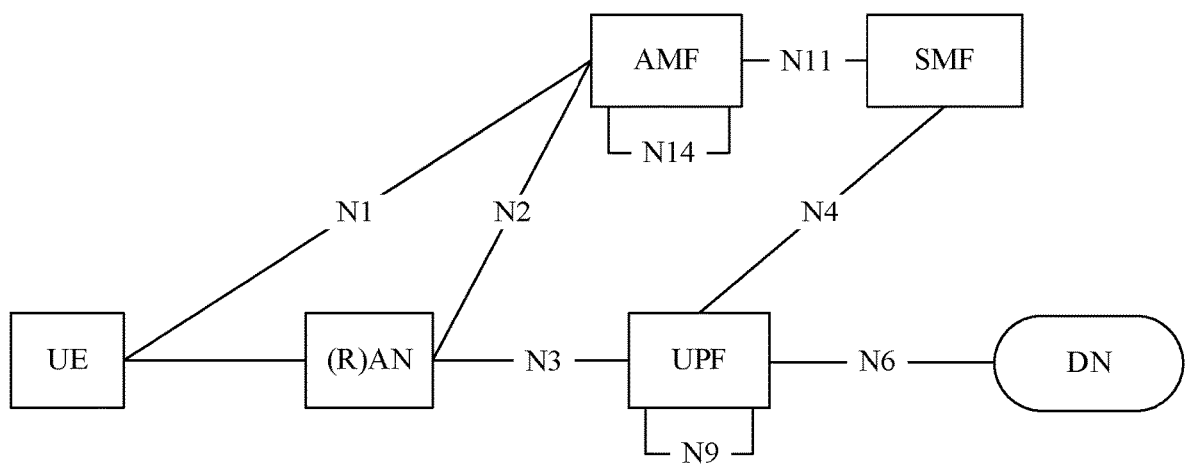
FIG. 3A is a schematic diagram of an example architecture of a next-generation communications system according to an embodiment of this application.
Figure 3B:
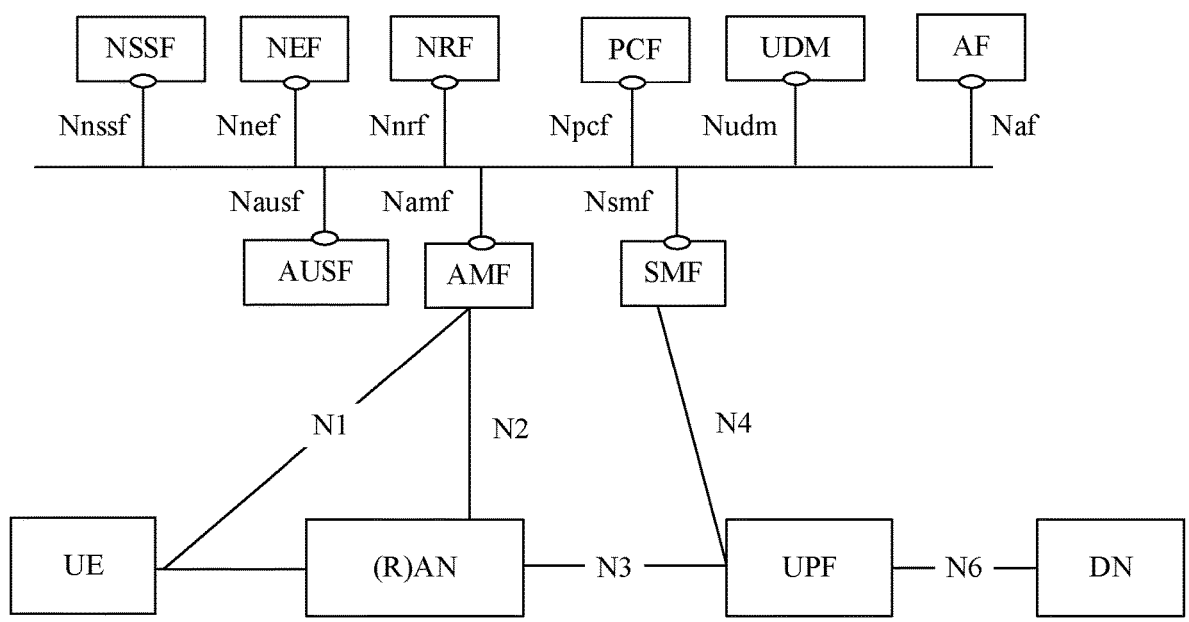
FIG. 3B is a schematic diagram of an example architecture of another next-generation communications system according to an embodiment of this application.

A next-generation communications system is used as an example. FIG. 3A and FIG. 3B each are a schematic diagram of an example architecture of a next-generation communications system according to an embodiment of this application. The communications system may include a terminal, an access network (AN) device or a radio access network (RAN) device, and an access and mobility management function (AMF) entity, and may further include a user plane function (UPF) entity and a session management function (SMF) entity. It should be noted that function entities included in FIG. 3A and functions of the function entities may be the same as those in FIG. 3B. In FIG. 3A, because a reference point is used as a basis, a message between function entities is an interface-based message, and does not need to carry a function entity identifier. However, in FIG. 3B, because a service-oriented interface is used as a basis, a message sent by one function entity to another function entity needs to carry an identifier of the another function entity. The access and mobility management network element 100 in FIG. 2 may be the AMF herein. The terminal accesses a network through the AN or the RAN. The AMF is mainly responsible for access management of the terminal. The UPF is mainly responsible for forwarding a packet data packet, controlling quality of service (QoS), collecting statistics about charging information, and the like. The SMF is responsible for all session management. In FIG. 3A and FIG. 1b, another function entity may be further included, and only several function entities in this application are mainly described herein. The entities are connected to each other through Nx interfaces (for example, N1 and N2 in the figure). It should be noted that the access and mobility management function entity, the session management function entity, and the user plane function entity are merely names, and the names constitute no limitation on the entities. For example, the access and mobility management function entity may be replaced with an "access and mobility management function" or have another name. In addition, the access and mobility management function entity may correspond to an entity that includes another function in addition to an access and mobility management function. The session management function entity may be replaced with a "session management function" or have another name. In addition, the session management function entity may correspond to an entity that includes another function in addition to a session management function. The user plane function entity may be replaced with a "user plane function" or have another name. In addition, the user plane function entity may correspond to an entity that includes another function in addition to a user plane function. A description is provided herein, and details are not described below again.

In specific implementation, any function entity or network element in the system shown in FIG. 2, FIG. 3A, or FIG. 3B may be implemented by one physical device, or may be jointly implemented by a plurality of physical devices. This is not specifically limited in the embodiments of this application. In other words, it may be understood that any function entity or network element in the system may be a logical function module in a physical device, or may be a logical function module including a plurality of physical devices. This is not specifically limited in the embodiments of this application.

The terminal shown in FIG. 2, FIG. 3A, or FIG. 3B is a device having a wireless transceiver function. The terminal may be deployed on land, and includes an indoor or outdoor device, a handheld device, a wearable device, or a vehicle-mounted device; or may be deployed on the water (for example, on a ship); or may be deployed in the air (for example, on an airplane, a balloon, or a satellite). The terminal may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. Sometimes, the terminal may also be referred to as user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like.

It should be noted that, terms "system" and "network" in the embodiments of this application may be used interchangeably. "A plurality of" means two or more. In view of this, "a plurality of" may also be understood as "at least two" in the embodiments of this application. The term "and/or" describes an association relationship for describing associated objects and represents that three relationships may exist. For example, A and/or B may represent the following three cases: only A exists, both A and B exist, and only B exists. In addition, the character "/" usually indicates an "or" relationship between the associated objects. In addition, to clearly describe the technical solutions in the embodiments of this application, in the embodiments of this application, terms such as "first" and "second" are used to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In a 5th generation (5G) mobile communications network, an RRC inactive mode is proposed. A feature of the mode is that a terminal is in an idle mode relative to a base station, and the base station is connected to a core network (through an N2/N3 interface).

When the terminal is in the RRC inactive mode, because an RRC connection between an NG-RAN and the terminal is suspended, the foregoing step 5 cannot be performed. Consequently, when a PDU session deactivation procedure initiated by a network is performed, the terminal cannot delete related information of the to-be-deactivated session in a timely manner. Further, if the terminal continues to transmit data in the PDU session, data transmission fails.

Therefore, when the terminal is in the RRC inactive mode, how to process related information of a to-be-deactivated session in a timely manner is a problem that needs to be resolved.

This application provides a session management method and apparatus, and a communications system. A network initiates a session deactivation procedure to deactivate one or more sessions of a terminal. After the terminal in an inactive mode establishes an RRC connection to a new second base station, the second base station indicates, through RRC connection reconfiguration, the terminal to delete related information of the to-be-deactivated session, or the second base station uses an RRC connection resume response message to carry an identifier of the one or more to-be-deactivated sessions, and the terminal deletes session-related information corresponding to the identifier of the one or more to-be-deactivated sessions. In this way, the terminal is enabled to process the related information of the to-be-deactivated session in a timely manner.

Figure 4A:
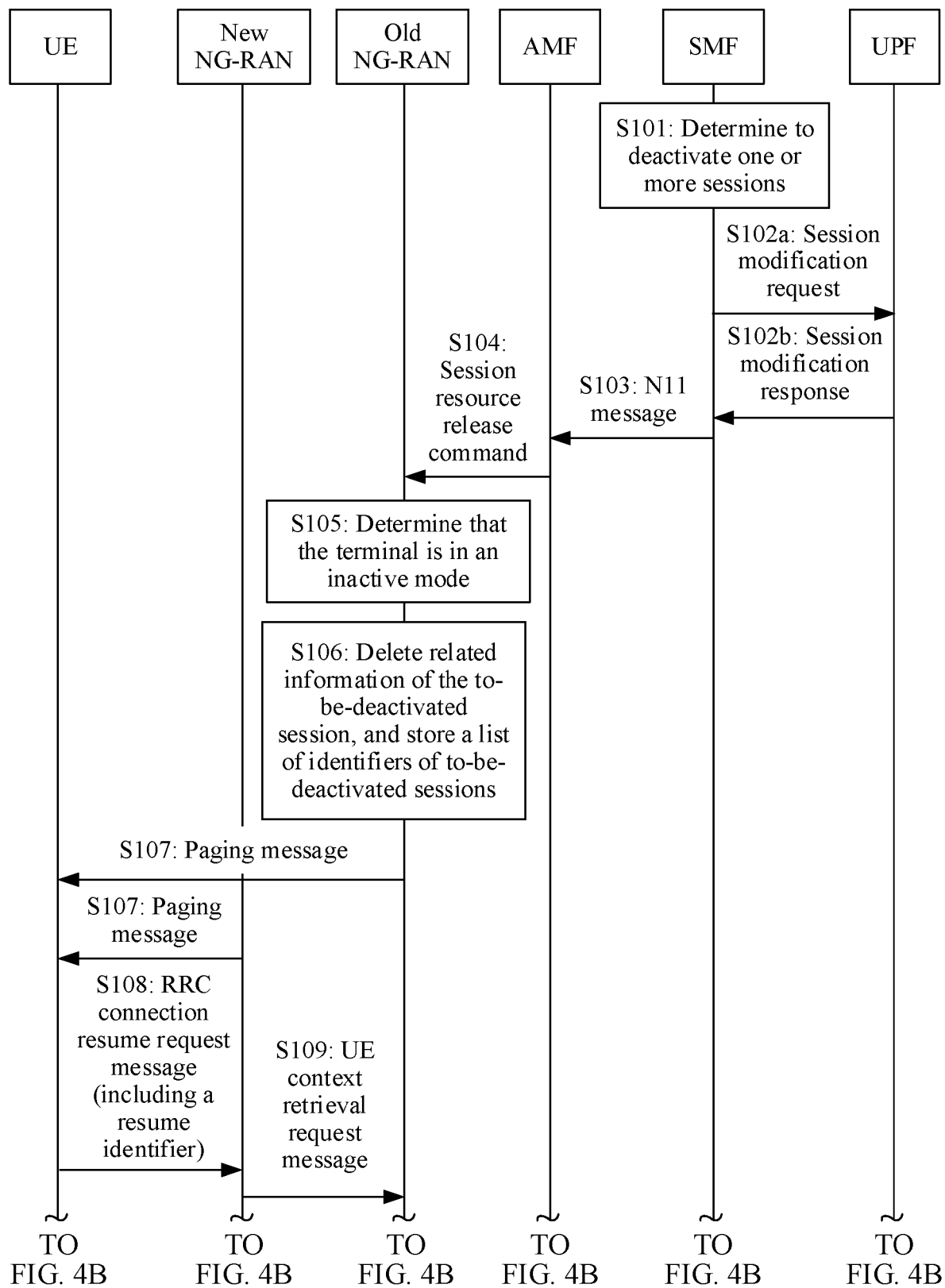
FIG. 4A and FIG. 4B are schematic interaction flowcharts of a session management method according to an embodiment of this application.
Figure 4B:
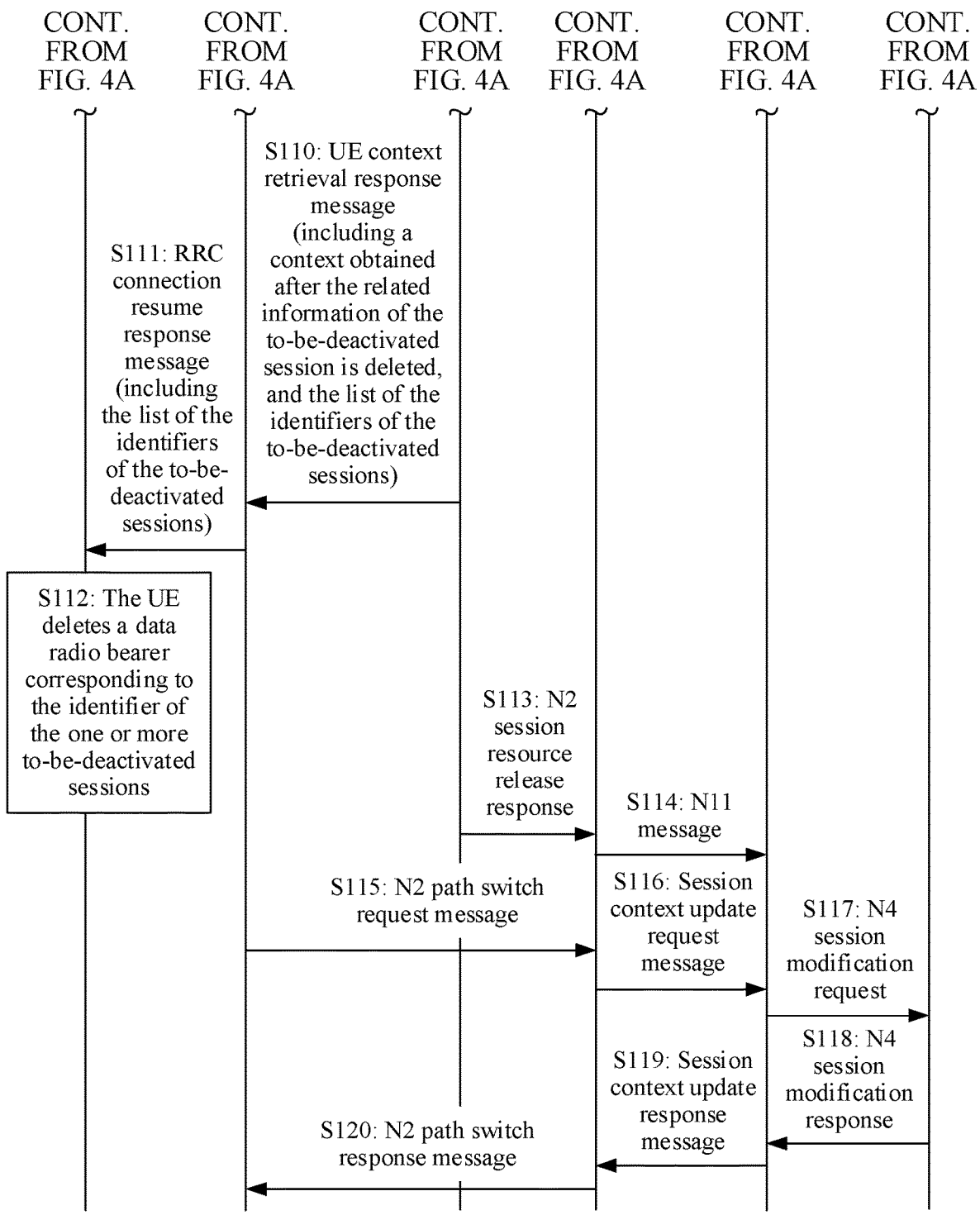

FIG. 4A and FIG. 4B are a schematic interaction flowchart of a session management method according to an embodiment of this application. Application of the method in the next-generation communications system shown in FIG. 3A is used as an example. Certainly, the method may alternatively be applied to the next-generation communications system shown in FIG. 3B and another communications system. In this embodiment, a first base station is specifically an old NG-RAN, and a second base station is specifically a new NG-RAN. The method may include the following steps.

S101: A UPF sends a notification (N4 reporting) message to an SMF, to notify the SMF that no data is currently transmitted in one or more PDU sessions, and the one or more PDU sessions may be deactivated. The one or more PDU sessions are sessions corresponding to specific UE.

The SMF determines, based on the notification message, to deactivate the one or more PDU sessions.

S102a and S102b: The SMF performs a session modification (N4 session modification) procedure.

Specifically, the N4 session modification procedure mainly includes the following steps.

S102a: The SMF sends a session modification request (N4 session modification request) message to the UPF, to request to modify parameter information related to the PDU session. The parameter information related to the PDU session includes a related parameter of quality of service (QoS), a packet detection rule (PDR), a QoS flow identifier (QoSflow ID, QFI), a reflective QoS identifier (Reflective QoS ID, RQI), a RAN tunnel, and the like.

S102b: The UPF sends a session modification response (N4 session modification response) message to the SMF.

S103: The SMF sends an N11 message to an AMF, where the message carries a session resource release command (N2 PDU session resource release command). The command includes N2 interface session management related information (N2 SM info).

The N2 SM info is mainly used to create or modify a context (UE context) of the PDU session. The N2 SM info includes an identifier (PDU Session ID) of the one or more to-be-deactivated sessions of a terminal, QoS parameter information (QoS profile), N3 tunnel information (CN N3 tunnel info), and slice information (S-NSSAI).

The session resource release command may be used to indicate to release related information, for example, a DRB, corresponding to the identifier of the one or more to-be-deactivated sessions of the terminal.

S104: The AMF sends the session resource release command (N2 PDU session resource release command) to the old NG-RAN. The command includes the N2 SM info. The old NG-RAN receives the session resource release command.

S105: The old NG-RAN determines that the UE is currently in an RRC inactive mode.

Whether the UE can be in the RRC inactive mode is determined by a base station.

The base station may use the following two manners for determining. In one manner, the UE stores RRC inactive mode information of the UE. In the other manner, the RAN determines that the RAN currently stores the UE context. However, an air interface between the UE and the RAN is not connected, but the RAN and the AMF are connected. Therefore, the RAN determines that the UE is currently in the RRC inactive mode.

The AMF sends the session resource release command to the old NG-RAN. However, because the UE is in the RRC inactive mode, the old NG-RAN cannot indicate the UE to release the session-related information.

S106: The old NG-RAN parses the N2 SM info, deletes the related information of the to-be-deactivated PDU session from the context (UE context) of the terminal, and stores a list of identifiers of to-be-deactivated PDU sessions (deactivated PDU session ID list). The list of the identifiers of the to-be-deactivated PDU sessions includes one or more PDU session identifiers (PDU session ID).

This step is an optional step. Specifically, the old NG-RAN stores the UE context. In addition to the PDU session identifier, the UE context further includes a radio resource such as a DRB configured by the RAN for the PDU session, and some security-related information. After parsing the N2

SM info, the old NG-RAN obtains the identifier of the one or more to-be-deactivated PDU sessions, and modifies the UE context based on the session identifier(s) to delete the related information of the to-be-deactivated session. Details include: deleting the DRB corresponding to the session identifier from the UE context, deleting the identifier of the one or more to-be-deactivated sessions from the UE context, and the like.

The old NG-RAN may further separately store the identifier of the one or more to-be-deactivated PDU sessions in the list.

S107: The old NG-RAN and a neighboring NG-RAN (including the new NG-RAN) of the old NG-RAN each send a paging message to the UE. The UE receives the paging message.

Each NG-RAN periodically or irregularly broadcasts a paging message, and UE in a coverage area of the NG-RAN may receive the paging message.

S108: The UE sends an RRC connection resume request message to the new NG-RAN. The new NG-RAN receives the RRC connection resume request message. The RRC connection resume request message carries a resume ID.

In this case, the UE is still in the RRC inactive mode. The UE enters another mode, that is, a connected mode, only after receiving an RRC connection resume response (RRC connection resume accept).

The UE selects the new NG-RAN according to a random access mechanism of a network. A reason is that the new NG-RAN has a strongest signal or the old NG-RAN has no available resource at a location on which the UE currently camps. In other words, the UE moves to a new base station for camping.

S109: The new NG-RAN sends a UE context retrieval request message to the old NG-RAN. The old NG-RAN receives the context retrieval request message.

The UE is handed over from the old NG-RAN to the new NG-RAN and camps on the new NG-RAN. The new NG-RAN stores no UE context and may request the UE context from the old NG-RAN.

S110: The old NG-RAN returns a context retrieval response message to the new NG-RAN.

The response message carries the UE context and the N2 SM info. In addition, because the old NG-RAN has parsed the N2 SM info in S106 and stored the list of the identifiers of the to-be-deactivated PDU sessions, the response message may alternatively carry the list of the identifiers of the to-be-deactivated PDU sessions. The new NG-RAN receives the response message. In addition, because the old NG-RAN has modified the UE context in S106 and deleted DRB information corresponding to the identifier of the to-be-deactivated PDU session, the UE context carried in the response message is modified UE context.

S111: The new NG-RAN returns an RRC connection resume response (RRC connection resume accept) message to the UE. The RRC connection resume response message carries the list of the identifiers of the to-be-deactivated PDU sessions. The UE receives the RRC connection resume response message.

S112: the UE locally deletes the session-related information corresponding to the identifier of the one or more to-be-deactivated sessions.

The UE locally stores the UE context of the UE. Based on the list of the identifiers of the to-be-deactivated PDU sessions in the RRC connection resume response message, the UE deletes, from the locally stored UE context, the identifier of the one or more to-be-deactivated PDU sessions in the list of the identifiers of the to-be-deactivated PDU sessions, and the DRB corresponding to the session identifier.

S113: The old NG-RAN returns a terminal PDU session resource release (N1 PDU session resource release) success response message to the AMF. As shown in FIG. 3A, N1 is an interface between the UE and the AMF. The AMF receives the session resource release success response message.

S114: The AMF returns an N11 message response to the SMF.

The N11 message response is a response for the N11 message sent by the SMF to the AMF in S103. In this case, the session deactivation processing procedure is completed.

S113 and S114 may be performed in parallel with S111 and S112, and a sequence thereof is not limited.

S115 to S120 are a path switch process in which the UE moves to the new NG-RAN, and specifically include the following steps.

S115: The new NG-RAN sends an N2 path switch request message to the AMF. The AMF receives the path switch request message.

S116: The AMF sends a PDU session context update request (Nsmf_PDUsession_updateSMcontext request) message to the SMF. The SMF receives the context update request message.

S117: The SMF sends an N4 session modification request message to the UPF. The UPF receives the session modification request message.

S118: The UPF sends an N4 session modification response (N4 session modification response) message to the SMF. The SMF receives the session modification response message.

S119: The SMF sends a PDU session context update response (Nsmf_PDUsession_updateSMcontext response) message to the AMF. The AMF receives the context update response message.

S120: The AMF sends an N2 path switch response (N2 path switch ACK) message to the new NG-RAN. The new NG-RAN receives the path switch response message.

According to the session management method provided in this embodiment of this application, the network initiates the session deactivation procedure to deactivate the one or more sessions of the terminal. After the terminal in the inactive mode establishes an RRC connection to the new second base station, the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

Figure 5:
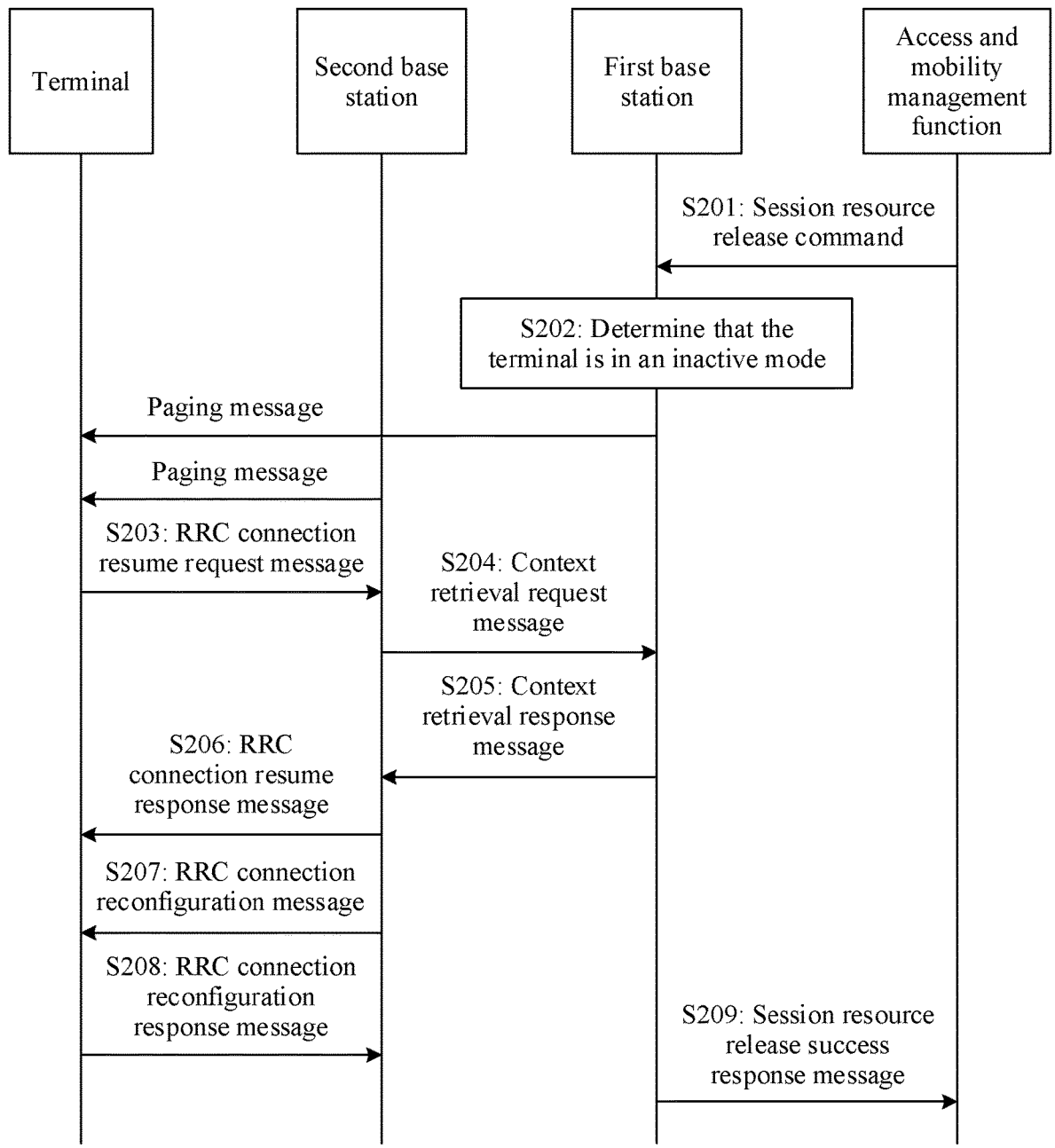
FIG. 5 is a schematic interaction flowchart of another session management method according to an embodiment of this application.

FIG. 5 is a schematic interaction flowchart of another session management method according to an embodiment of this application. The method may be applied to the foregoing communications system. The method may include the following steps.

S201: A first base station receives a session resource release command from an access and mobility management function, where the session resource release command includes N2 interface session management related information (N2 SM info), and the N2 SM info includes an identifier of one or more to-be-deactivated sessions of a terminal.

S202: The first base station determines that the terminal is in an inactive mode.

S203: A second base station receives a radio resource control RRC connection resume request message sent by the terminal.

S204: The second base station sends a context retrieval request message to the first base station.

S205: The first base station sends a context retrieval response message to the second base station, where the context retrieval response message includes the N2 SM info.

The context retrieval response message may further include a context of the terminal.

S206: The second base station sends an RRC connection resume response message to the terminal.

S207: The second base station sends an RRC connection reconfiguration message to the terminal, where the RRC connection reconfiguration message is used to indicate to reconfigure related information of the to-be-deactivated session.

S208: The second base station receives an RRC connection reconfiguration response message sent by the terminal.

A difference between this embodiment and the embodiment shown in FIG. 4A and FIG. 4B lies in S206 to S208: The second base station serves as a new base station on which the terminal camps, and the RRC connection resume response message sent by the second base station to the terminal does not carry the N2 SM info or a list of identifiers of to-be-deactivated sessions. Instead, after the second base station sends the RRC connection resume response message to the terminal, the terminal enters a connected mode, and then the second base station and the terminal perform a process of RRC connection reconfiguration. The RRC connection reconfiguration is used to reconfigure session-related information of the terminal, for example, DRB information.

S209: The first base station sends a session resource release success response message to the AMF.

The following uses specific communication scenarios to describe in detail a specific implementation procedure in which the second base station indicates, through RRC connection reconfiguration, the terminal to delete a data radio bearer corresponding to the to-be-deactivated session in the embodiment shown in FIG. 5.

Figure 6A:
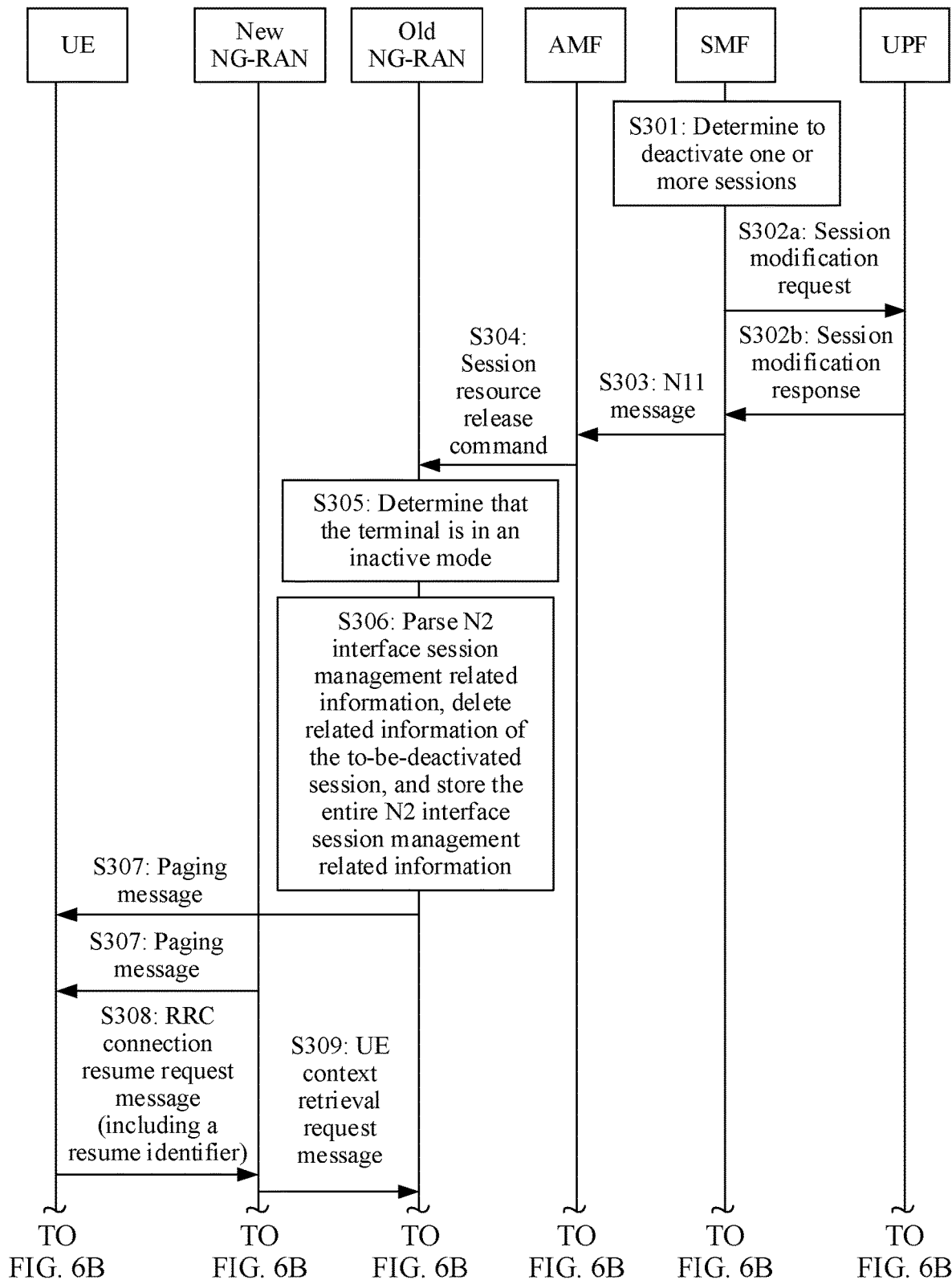
FIG. 6A and FIG. 6B are schematic interaction flowcharts of a session management method in an example communication scenario according to an embodiment of this application.
Figure 6B:
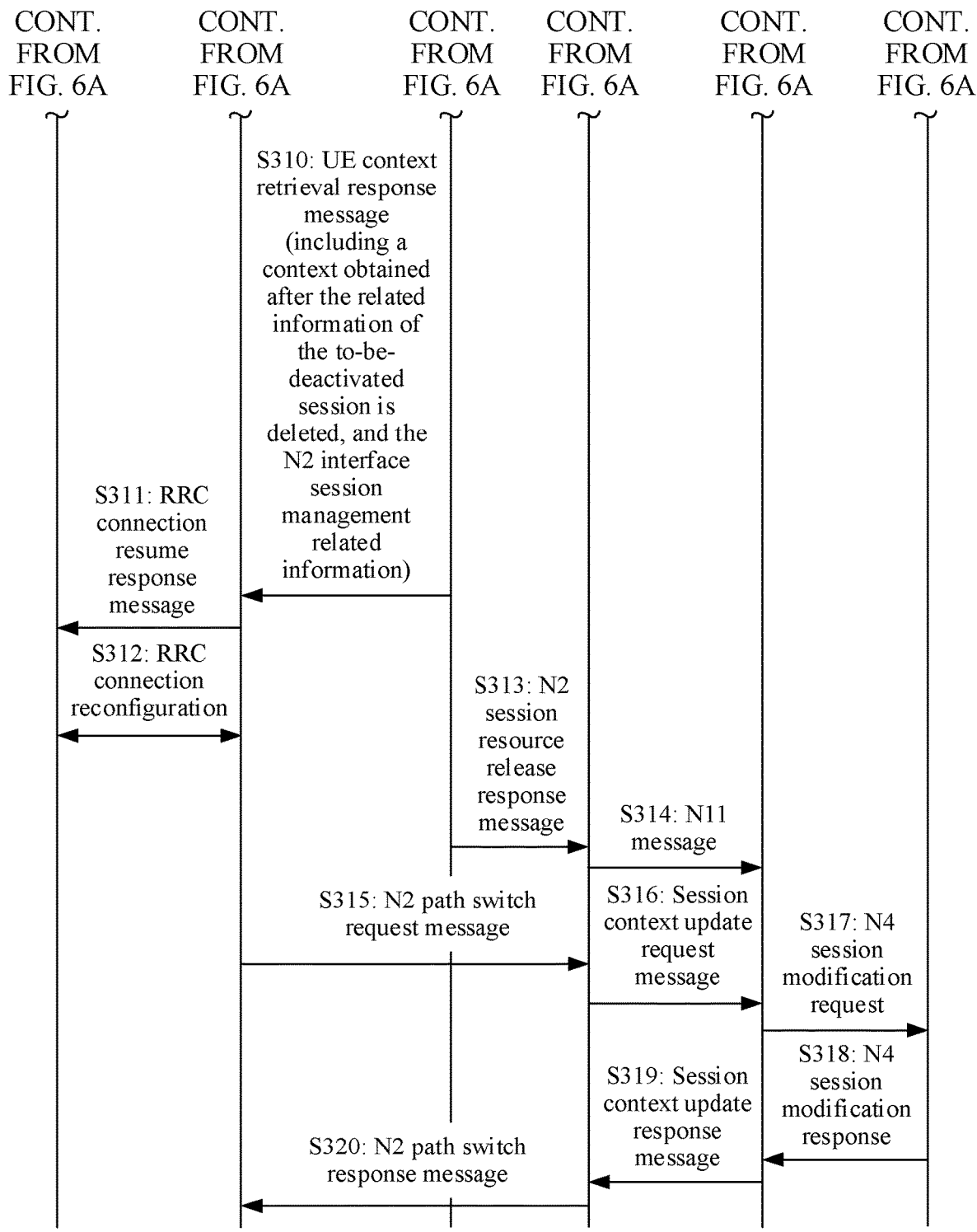

FIG. 6A and FIG. 6B are schematic interaction flowcharts of a session management method in an example communication scenario according to an embodiment of this application. Application of the method in the next-generation communications system shown in FIG. 3A is used as an example. In this embodiment, a first base station is specifically an old NG-RAN, and a second base station is specifically a new NG-RAN. The method may include the following steps.

S301: An SMF determines to deactivate one or more PDU sessions.

S302a and S302b: The SMF performs an N4 session modification procedure.

S303: The SMF sends an N11 message to an AMF, where the message carries an N2 PDU session resource release command.

S304: The AMF sends an N2 PDU session resource release command to the old NG-RAN. The command includes N2 SM info.

S305: The old NG-RAN determines that the UE is in an RRC inactive mode.

For S301 to S305, respectively refer to S101 to S105 in the embodiment shown in FIG. 4A and FIG. 4B. Details are not described herein again.

S306: The old NG-RAN parses the N2 SM info, modifies UE context to delete related information of the to-be-deactivated PDU session, and completely stores the N2 SM info.

In this embodiment that is different from the embodiment shown in FIG. 4A and FIG. 4B, although the old NG-RAN parses the N2 SM info, the old NG-RAN does not store a list of identifiers of one or more to-be-deactivated PDU sessions, but completely stores the N2 SM info, namely, N2 SM info that is not parsed.

S307: The old NG-RAN and a neighboring NG-RAN of the old NG-RAN each send a paging message to the UE.

S308: The UE sends an RRC connection resume request message to the new NG-RAN.

S309: The new NG-RAN sends a UE context retrieval request message to the old NG-RAN.

S310: The old NG-RAN returns a retrieval response message to the new NG-RAN, where the response message carries the N2 SM info, and may further carry the UE context.

For S307 to S310, respectively refer to S107 to S110 in the embodiment shown in FIG. 4A and FIG. 4B. Details are not described herein again.

S311: The new NG-RAN returns an RRC connection resume accept response message to the UE.

In this embodiment that is different from the embodiment shown in FIG. 4A and FIG. 4B, it is not expected to modify the response message. Therefore, the response message does not carry the N2 SM info. After receiving the response message, the UE enters a connected mode.

S312: The new NG-RAN performs RRC connection reconfiguration with the UE.

After the UE enters the connected mode, the new NG-RAN may perform RRC connection reconfiguration on the UE based on the received N2 SM info. The RRC connection reconfiguration is that the new NG-RAN reconfigures the UE based on parameter information in the N2 SM info, and specifically includes: deleting an identifier of the one or more to-be-deactivated sessions, and deleting DRB information corresponding to the identifier of the one or more to-be-deactivated sessions. Specifically, the new NG-RAN sends a connection reconfiguration request message to the UE, where the request message includes the to-be-deleted identifier of the one or more to-be-deactivated sessions and the to-be-deleted DRB information corresponding to the identifier of the one or more sessions. The UE sends a connection reconfiguration response message to the new NG-RAN.

S313: The old NG-RAN returns an N1 PDU session resource release success response message to the AMF.

S314: The AMF returns an N11 message response to the SMF.

S311 and S312 may be performed in parallel with S313 and S314, and a sequence thereof is not limited.

S315 to S320 are a path switch process in which the UE moves to the new NG-RAN. For details, refer to S115 to S120 in the embodiment shown in FIG. 4A and FIG. 4B. Details are not described herein again.

Figure 1:
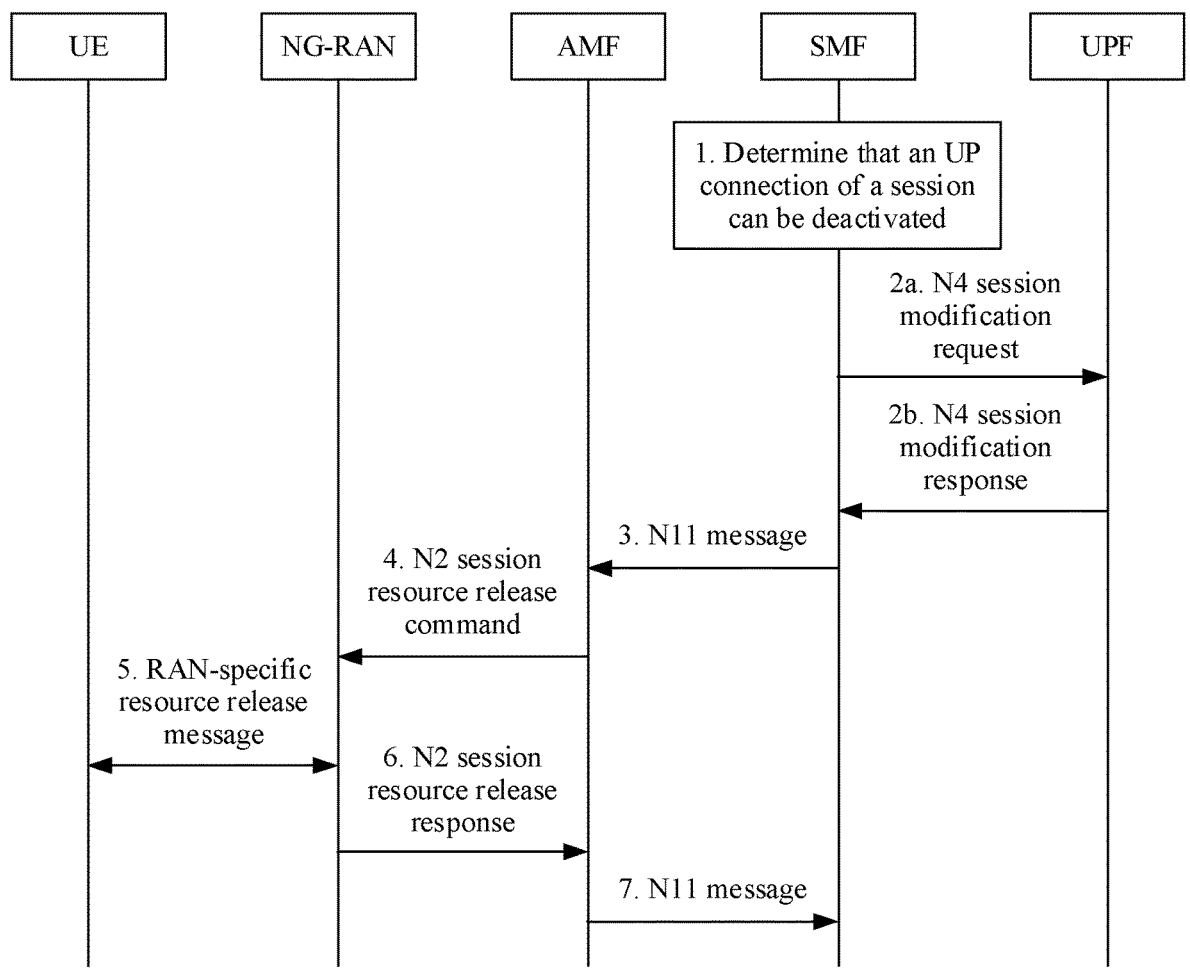
FIG. 1 is a schematic diagram of a session deactivation procedure performed when a terminal is in a connected mode.
Figures 1, 7A:
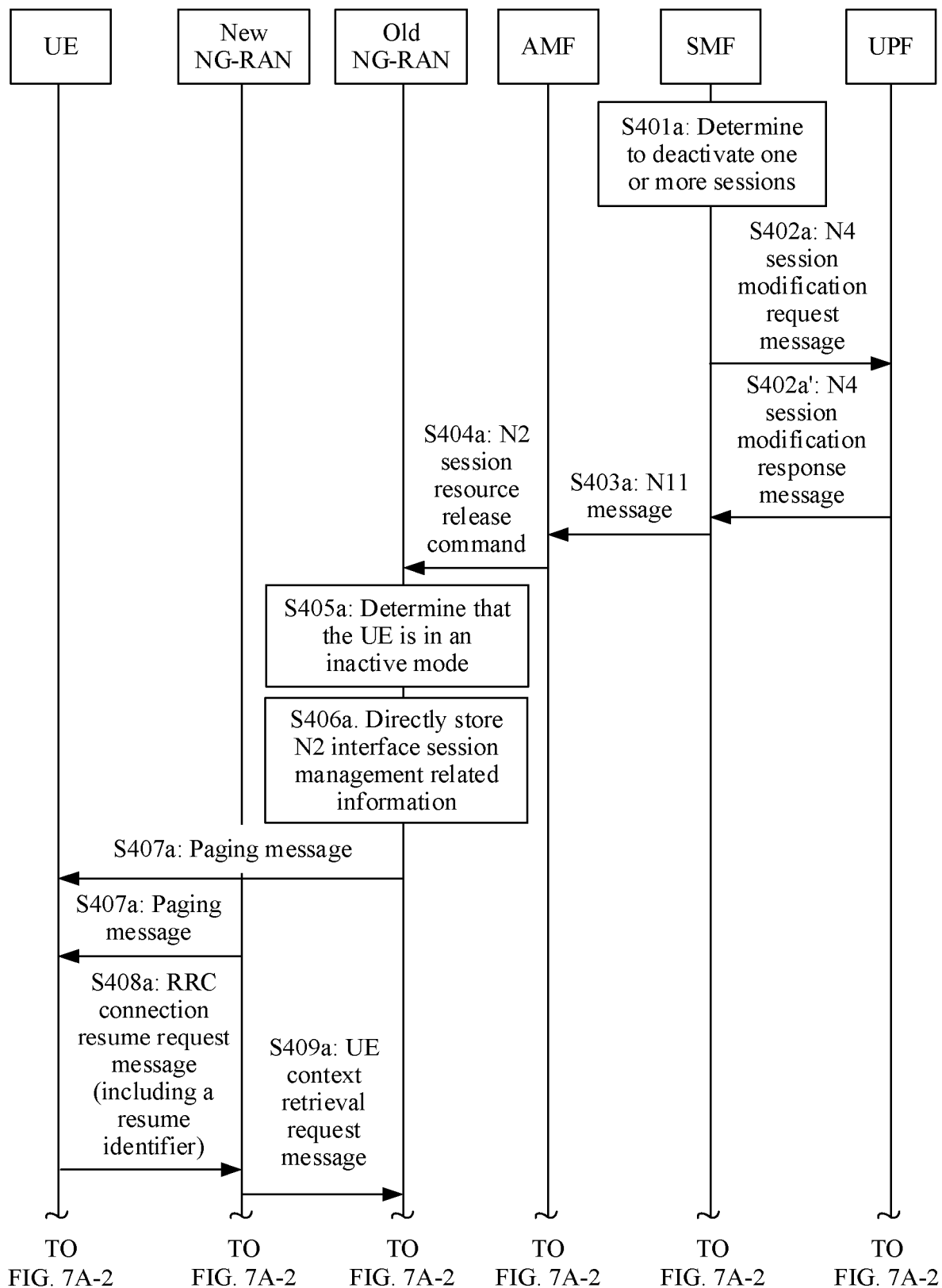
Figures 2, 7A:
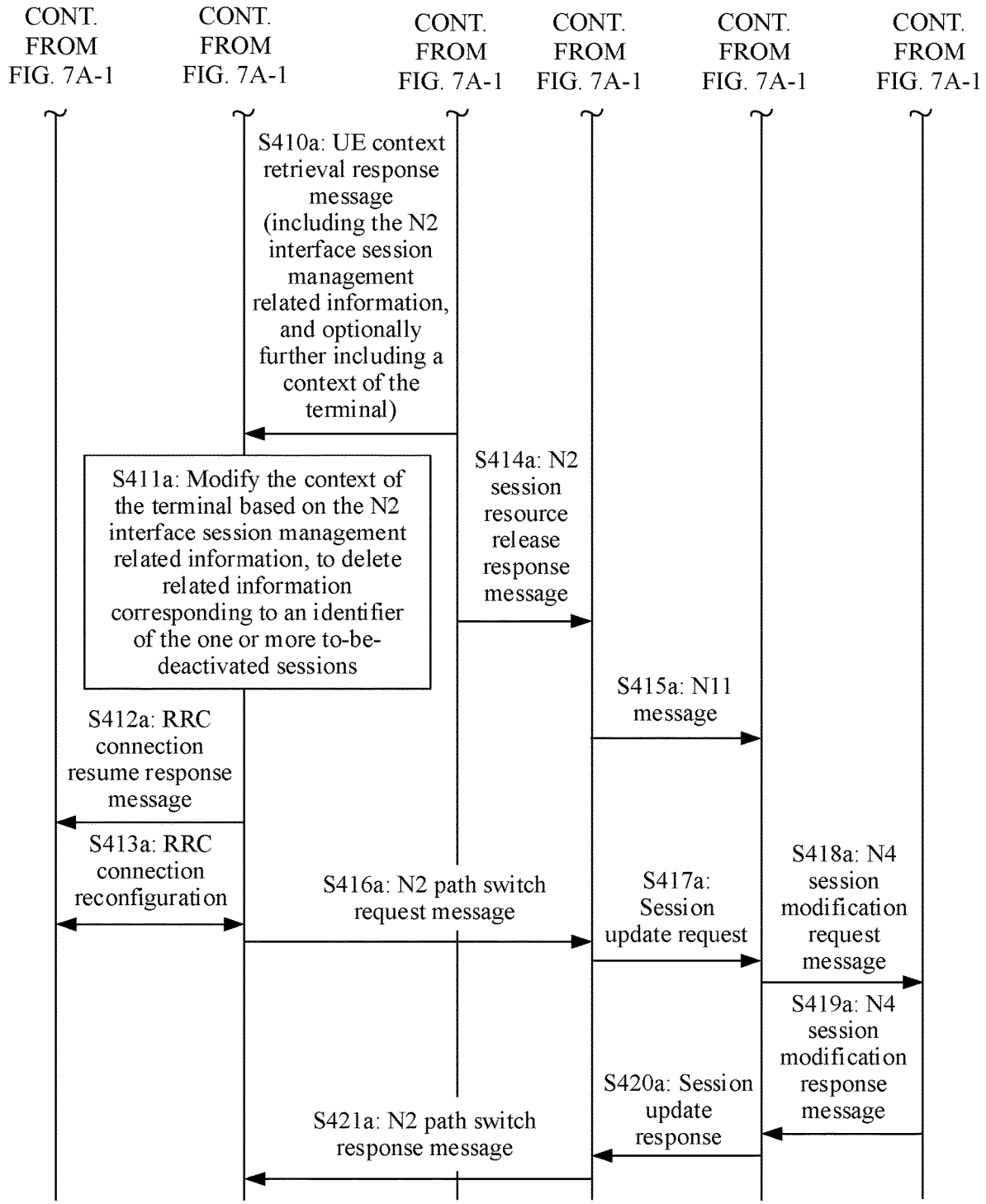

FIG. 7A-1 and FIG. 7A-2 are a schematic interaction flowchart of a session management method in another example communication scenario according to an embodiment of this application. Application of the method in the next-generation communications system shown in FIG. 3A is used as an example. Certainly, the method may alternatively be applied to the next-generation communications system shown in FIG. 3B and another communications system. In this embodiment, a first base station is specifically an old NG-RAN, and a second base station is specifically a new NG-RAN. The method may include the following steps.

S401a: An SMF determines to deactivate one or more PDU sessions.

S402a and S402a': The SMF performs an N4 session modification procedure.

S403a: The SMF sends an N11 message to an AMF, where the message carries an N2 PDU session resource release command.

S404a: The AMF sends an N2 PDU session resource release command to the old NG-RAN. The command carries N2 SM info.

S405a: The old NG-RAN determines that the UE is in an RRC inactive mode.

For S401a to S405a, respectively refer to S101 to S105 in the embodiment shown in FIG. 4A and FIG. 4B. Details are not described herein again.

S406a: The old NG-RAN stores the N2 SM info.

In this embodiment, the old NG-RAN does not parse the N2 SM info.

S407a: The old NG-RAN and a neighboring NG-RAN of the old NG-RAN each send a paging message to the UE.

S408a: The UE sends an RRC connection resume request message to the new NG-RAN.

S409a: The new NG-RAN sends a UE context retrieval request message to the old NG-RAN.

S410a: The old NG-RAN returns a retrieval response message to the new NG-RAN. The response carries the N2 SM info, and may further carry a UE context.

In this embodiment, the old NG-RAN does not perform any processing, but directly sends the N2 SM info and the unmodified UE context to the new NG-RAN. After performing S410, the old NG-RAN starts a timer. When the timer expires, the old NG-RAN automatically deletes related information of the to-be-deactivated PDU session.

S411a: The new NG-RAN modifies the UE context based on the N2 SM info, to delete the related information corresponding to the identifier of the one or more to-be-deactivated PDU sessions, where the related information includes the identifier and a DRB that are of the session.

After receiving the context retrieval response message, the new NG-RAN parses the N2 SM info, and deletes the related information corresponding to the identifier of the to-be-deactivated session.

S412a: The new NG-RAN returns an RRC connection resume success response message to the UE.

S413a: The new NG-RAN performs RRC connection reconfiguration with the UE.

S414a: The old NG-RAN returns an N1 PDU session resource release success response to the AMF.

S415a: The AMF returns an N11 message response to the SMF.

S411a to S413a may be performed in parallel with S414a and S415a, and a sequence thereof is not limited.

S416a to S421a are a path switch process in which the UE moves to the new NG-RAN. For details, refer to S115 to S120 in the embodiment shown in FIG. 4A and FIG. 4B. Details are not described herein again.

According to the session management method provided in this embodiment of this application, the network initiates a session deactivation procedure to deactivate the one or more sessions of the terminal. After the terminal in the inactive mode establishes an RRC connection to the new second base station, the second base station indicates, through RRC connection reconfiguration, the terminal to delete the related information of the to-be-deactivated session. In this way, the terminal is enabled to process the related information of the to-be-deactivated session in a timely manner.

Figures 1, 7B:
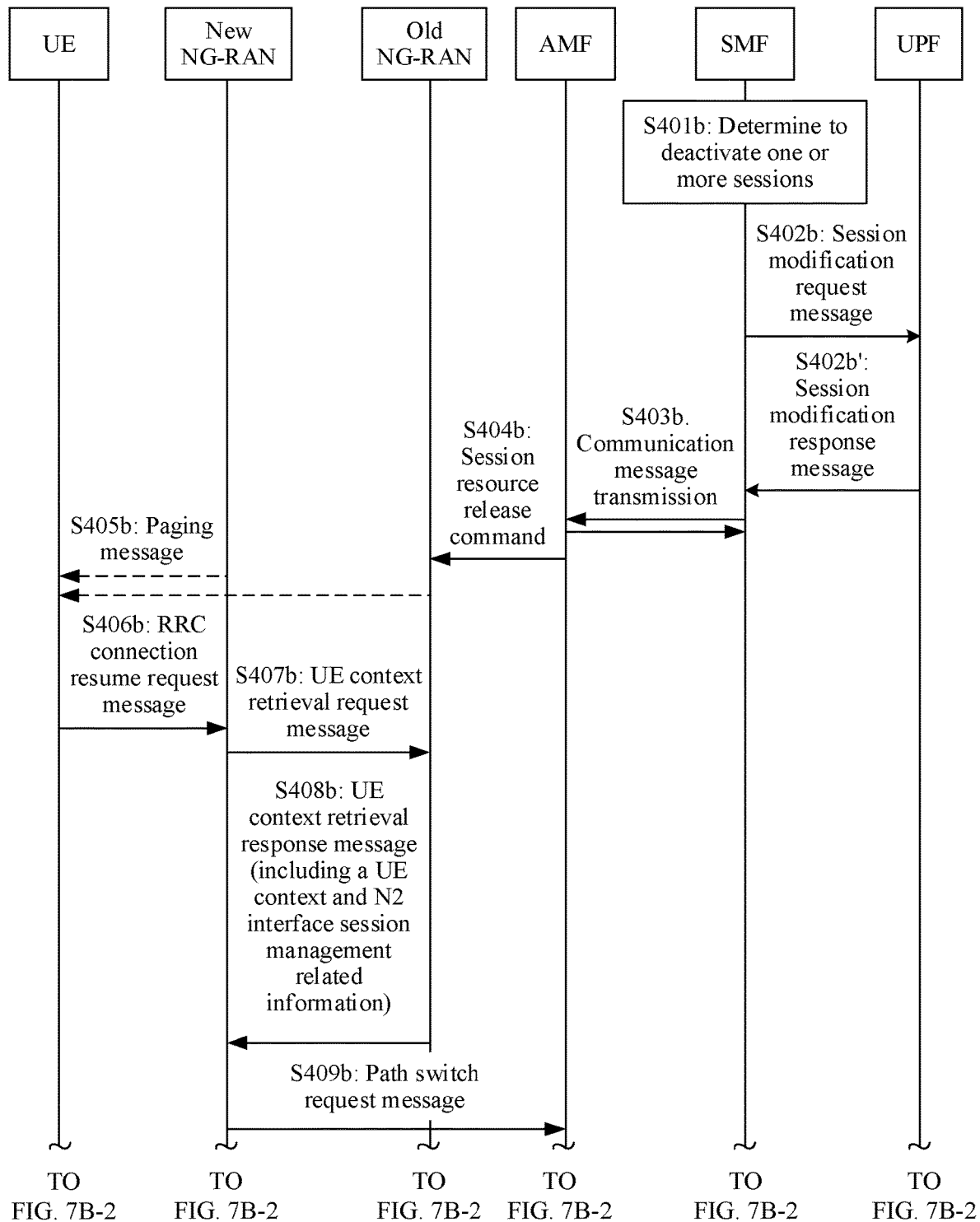
Figures 2, 7B:
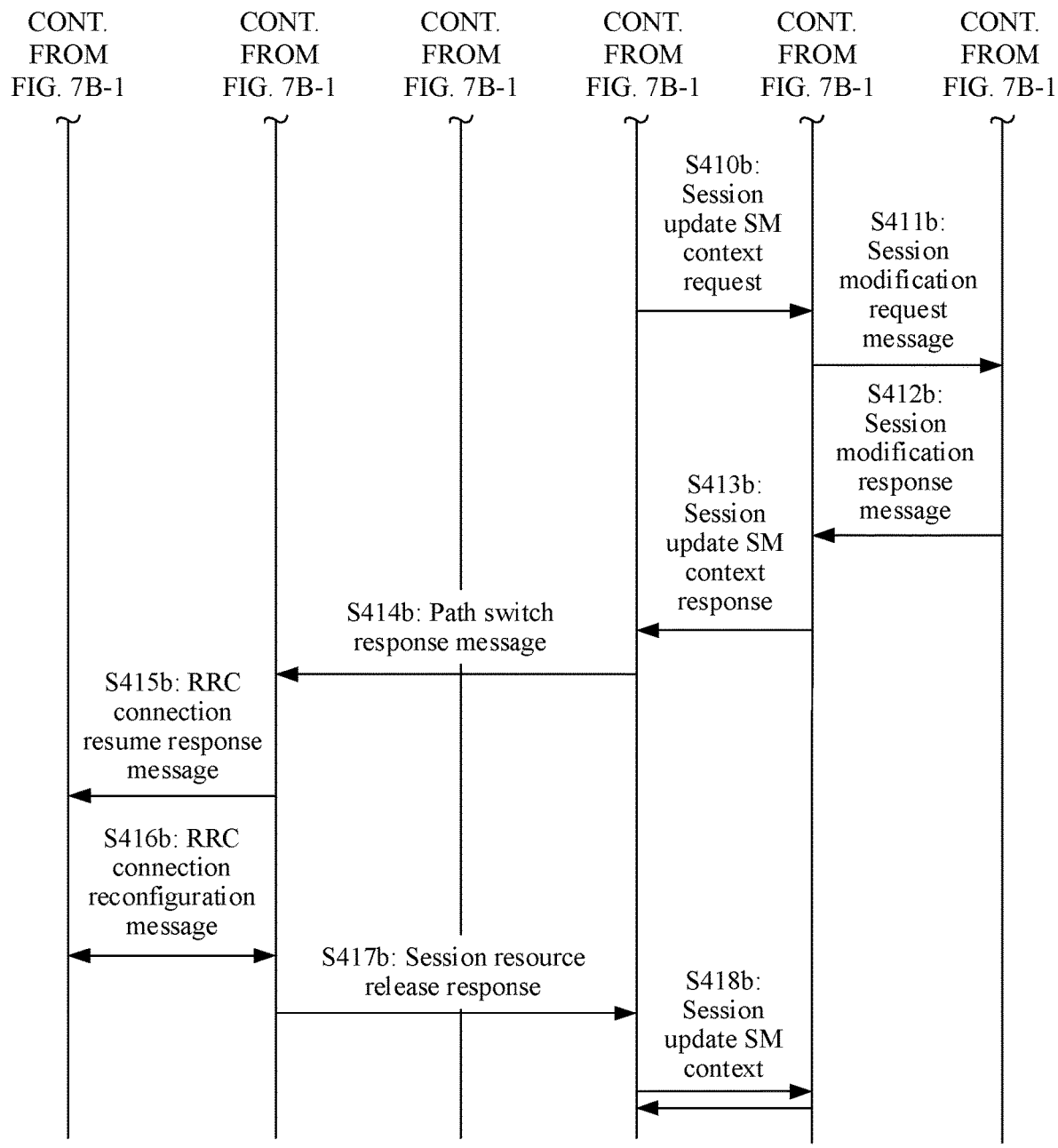

FIG. 7B-1 and FIG. 7B-2 are a schematic interaction flowchart of a session management method in still another example communication scenario according to an embodiment of this application. Application of the method in the next-generation communications system shown in FIG. 3B is used as an example. Certainly, the method may alternatively be applied to the next-generation communications system shown in FIG. 3A and another communications system. In this embodiment, a first base station is specifically an old NG-RAN, and a second base station is specifically a new NG-RAN.

A main difference between this embodiment and the foregoing embodiment is as follows: The old NG-RAN sends received N2 SM info to the new NG-RAN. In addition, after performing base station resource release for a to-be-deactivated PDU session on UE, the new NG-RAN returns an N2 PDU session resource release response to an AMF, and performs path switch after the new NG-RAN receives a context retrieval response message from the old NG-RAN.

The method may include the following steps.

S401b: A UPF sends a notification (N4 reporting) message to an SMF, to notify the SMF that no data is currently transmitted in one or more PDU sessions, and the one or more PDU sessions may be deactivated. The one or more PDU sessions are sessions corresponding to specific UE.

The SMF determines, based on the notification message, to deactivate the one or more PDU sessions.

S402b and S402b': The SMF performs a session modification (N4 session modification) procedure.

Specifically, the N4 session modification procedure mainly includes the following steps.

The SMF sends a session modification request (N4 session modification request) message to the UPF, to request to modify parameter information related to the PDU session. The parameter information related to the PDU session includes a related parameter of quality of service (QoS), a packet detection rule (PDR), a QoS flow identifier (QoSflow ID, QFI), a reflective QoS identifier (Reflective QoS ID, RQI), a RAN tunnel, and the like.

The UPF sends a session modification response (N4 session modification response) message to the SMF.

S403b: The SMF invokes an_Namf_Communication_N1N2MessageTransfer service to the AMF, where the service carries N2 SM info, and the N2 SM info includes a PDU session ID. In addition, the service may further carry a cause value, and the cause value is used to indicate the AMF to send a session resource release command (N2 PDU session resource release command) to an NG-RAN.

The N2 SM info is mainly used to create or modify a context (UE context) of the PDU session. The N2 SM info includes an identifier (PDU Session ID) of the one or more to-be-deactivated sessions of a terminal, QoS parameter information (QoS profile), N3 tunnel information (CN N3 tunnel info), and slice information (S-NSSAI).

The session resource release command may be used to indicate to release related information, for example, a DRB, corresponding to the identifier of the one or more to-be-deactivated sessions of the terminal.

S404b: The AMF sends the session resource release command (N2 PDU session resource release command) to the old NG-RAN. The command includes the N2 SM info. The old NG-RAN receives the session resource release command, and determines that the UE is currently in an RRC inactive mode. Therefore, a procedure in steps 7 to 17 is performed.

S405b: The old NG-RAN and the new NG-RAN each send a paging message to the UE. This step is optional. Alternatively, no paging message may be sent. When the UE needs to interact with the network, the UE directly performs step S406b.

S406b: The UE sends an RRC connection resume request message to the new NG-RAN.

S407b: The new NG-RAN sends a UE context retrieval request message to the old NG-RAN.

S408b: The old NG-RAN returns a retrieval response message to the new NG-RAN. The response carries the N2 SM info, and may further carry a UE context. Before returning the retrieval response message to the new NG-RAN, the old NG-RAN determines that the UE is currently in the RRC inactive mode.

S409b to S414b are a path switch process in which the UE moves to the new NG-RAN, and specifically include the following steps.

S409b: The new NG-RAN sends an N2 path switch request message to the AMF.

The AMF receives the path switch request message.

S410b: The AMF sends a PDU session context update request (Nsmf_PDUsession_updateSMcontext request) message to the SMF. The SMF receives the context update request message.

S411b: The SMF sends an N4 session modification request (N4 session modification request) message to the UPF. The UPF receives the session modification request message.

S412b: The UPF sends an N4 session modification response (N4 session modification response) message to the SMF. The SMF receives the session modification response message.

S413b: The SMF sends a PDU session context update response (Nsmf_PDUsession_updateSMcontext response) message to the AMF. The AMF receives the context update response message.

S414b: The AMF sends an N2 path switch response (N2 path switch ACK) message to the new NG-RAN. The new NG-RAN receives the path switch response message.

S415b: The new NG-RAN returns an RRC connection resume accept response message to the UE.

The foregoing steps S406b to S415b are a connection resume procedure performed when the UE is in the RRC inactive mode.

S416b: The new NG-RAN sends a base station specific resource release (RAN specific signalling exchange) message to the UE based on the received N2 SM info. The RAN specific signalling exchange message may be an RRC connection reconfiguration message, and the message is used to indicate to release the related information of the to-be-deactivated session. After completing execution based on the message, the UE returns a corresponding response to the new NG-RAN.

S417b: The new NG-RAN returns a terminal PDU session resource release (N2 PDU session resource release) response message to the AMF. The response message is triggered based on the N2 SM info received by the new NG-RAN.

S418b: The AMF invokes an Nsmf_PDUSession_UpdateSMContext service to complete acknowledgment for S403b, to indicate that an NG-RAN resource related to the to-be-deactivated PDU session is successfully released.

Figures 1, 8A:
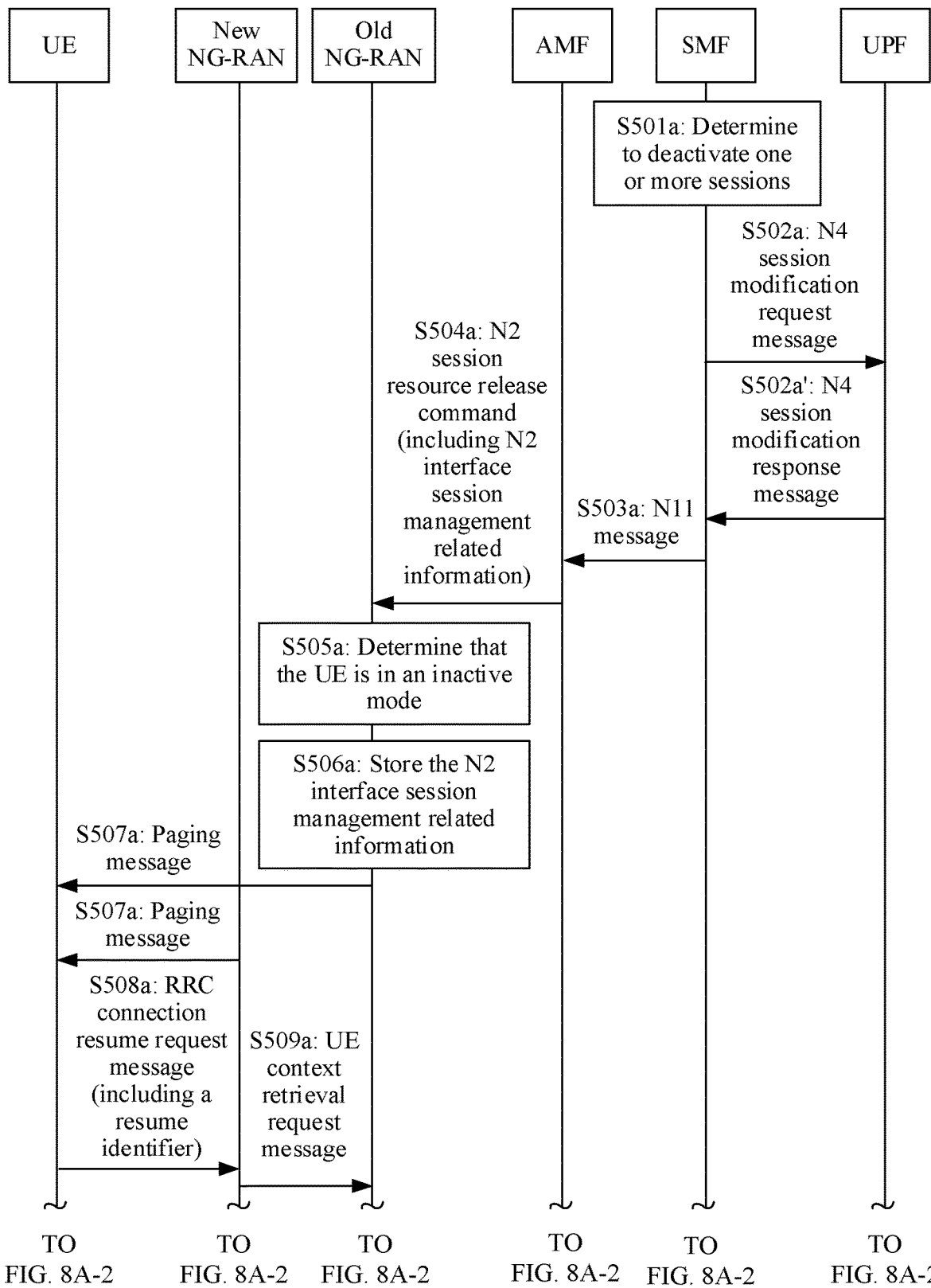
Figures 2, 8A:
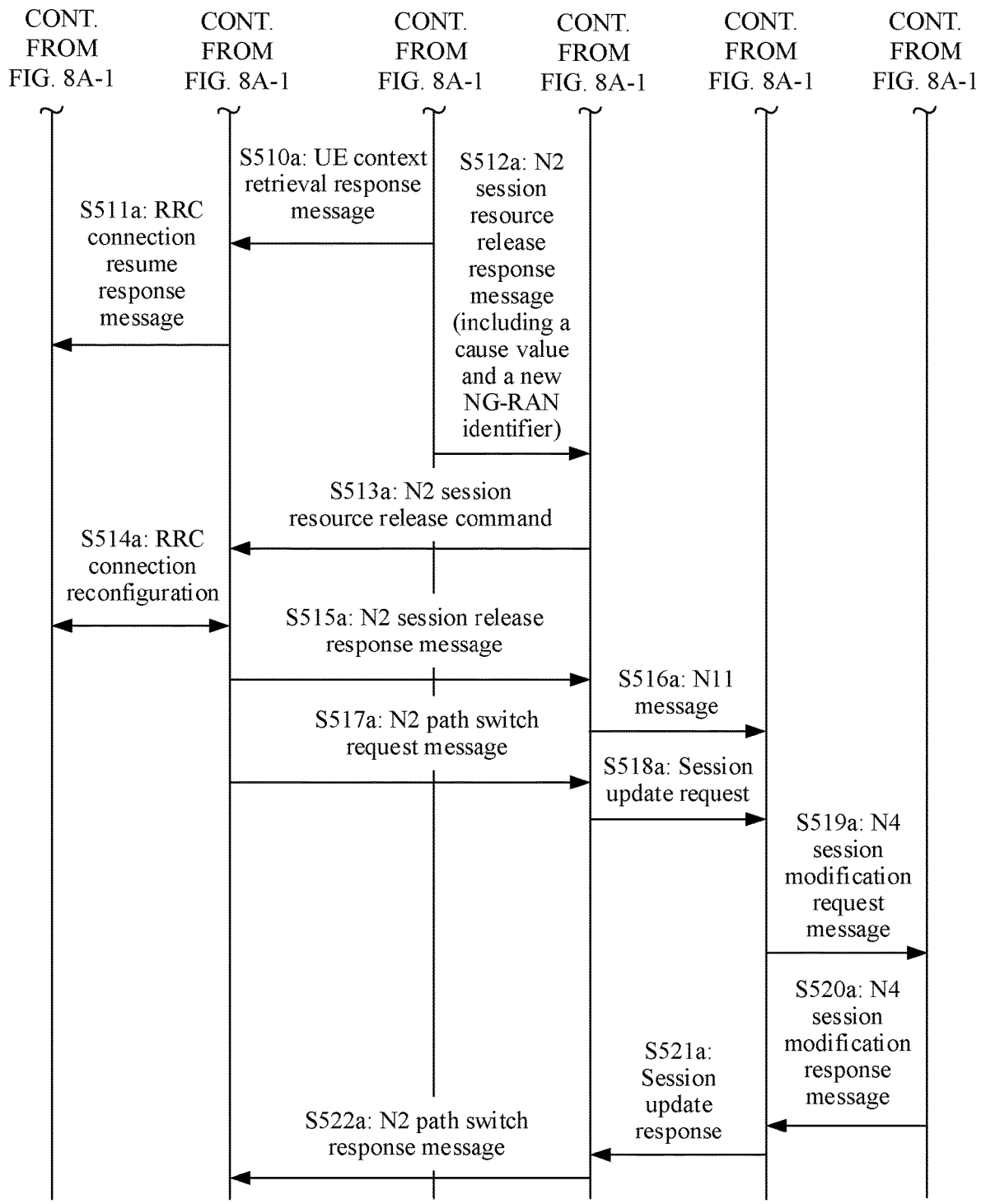

FIG. 8A-1 and FIG. 8A-2 are a schematic interaction flowchart of still another session management method according to an embodiment of this application. Application of the method in the next-generation communications system shown in FIG. 3A is used as an example. Certainly, the method may alternatively be applied to the next-generation communications system shown in FIG. 3B and another communications system. In this embodiment, a first base station is specifically an old NG-RAN, and a second base station is specifically a new NG-RAN. The method may include the following steps.

S501a: An SMF determines to deactivate one or more PDU sessions.

S502a and S502a': The SMF performs an N4 session modification procedure.

S503a: The SMF sends an N11 message to an AMF, where the message carries an N2 PDU session resource release command.

S504a: The AMF sends an N2 PDU session resource release command to the old NG-RAN. The N2 PDU session resource release command carries N2 SM info.

S505a: The old NG-RAN determines that the UE is in an RRC inactive mode.

S506a: The old NG-RAN stores the N2 SM info.

S507a: The old NG-RAN and a neighboring NG-RAN of the old NG-RAN each send a paging message to the UE.

S508a: The UE sends an RRC connection resume request message to the new NG-RAN.

S509a: The new NG-RAN sends a UE context retrieval request message to the old NG-RAN.

For S501a to S509a, respectively refer to S101 to S109 in the embodiment shown in FIG. 4A and FIG. 4B. Details are not described herein again.

S510a: The old NG-RAN returns a context retrieval response message to the new NG-RAN. The response carries a UE context.

S511a: The new NG-RAN returns an RRC connection resume success response message to the UE.

The context retrieval response message returned by the old NG-RAN does not carry the N2 SM info. In this case, the old NG-RAN or the new NG-RAN does not perform RRC connection reconfiguration.

S512a: The old NG-RAN sends an N2 PDU session resource release failure response message to the AMF. The response message carries a new NG-RAN ID. The response may carry a failure cause value or indication information used to indicate the AMF to resend an N2 PDU session resource release command to the new NG-RAN.

In an existing procedure, a session resource release success response is a response returned by the base station after the base station successfully performs RRC connection reconfiguration on the UE. In this embodiment, the old NG-RAN cannot perform RRC connection reconfiguration on the UE, and therefore can return only a session resource release failure response to the AMF.

S513a: The AMF sends the N2 PDU session resource release command to the new NG-RAN.

After receiving the new NG-RAN identifier and the failure cause value that are carried in the failure response, the AMF resends the session resource release command to the new NG-RAN.

S514a: The new NG-RAN performs RRC connection reconfiguration with the UE.

For a procedure of the RRC connection reconfiguration, refer to the foregoing embodiments. Details are not described herein again.

S515a: The new NG-RAN returns an N1 PDU session resource release success response message to the AMF.

S516a: The AMF returns an N11 message response to the SMF.

S517a to S522a are a path switch process in which the UE moves to the new NG-RAN. For details, refer to S115 to S120 in the embodiment shown in FIG. 4A and FIG. 4B. Details are not described herein again.

According to the session management method provided in this embodiment of this application, the network initiates a session deactivation procedure to deactivate the one or more sessions of a terminal. The old first base station cannot perform RRC connection reconfiguration with the terminal to delete related information of the one or more to-be-deactivated sessions, but returns the session resource release failure response message to the access and mobility management function. The access and mobility management function resends the session resource release command to the new second base station. The new second base station performs RRC connection reconfiguration with the terminal. In this way, the terminal is enabled to process the related information of the to-be-deactivated session in a timely manner.

Figures 1, 8B:
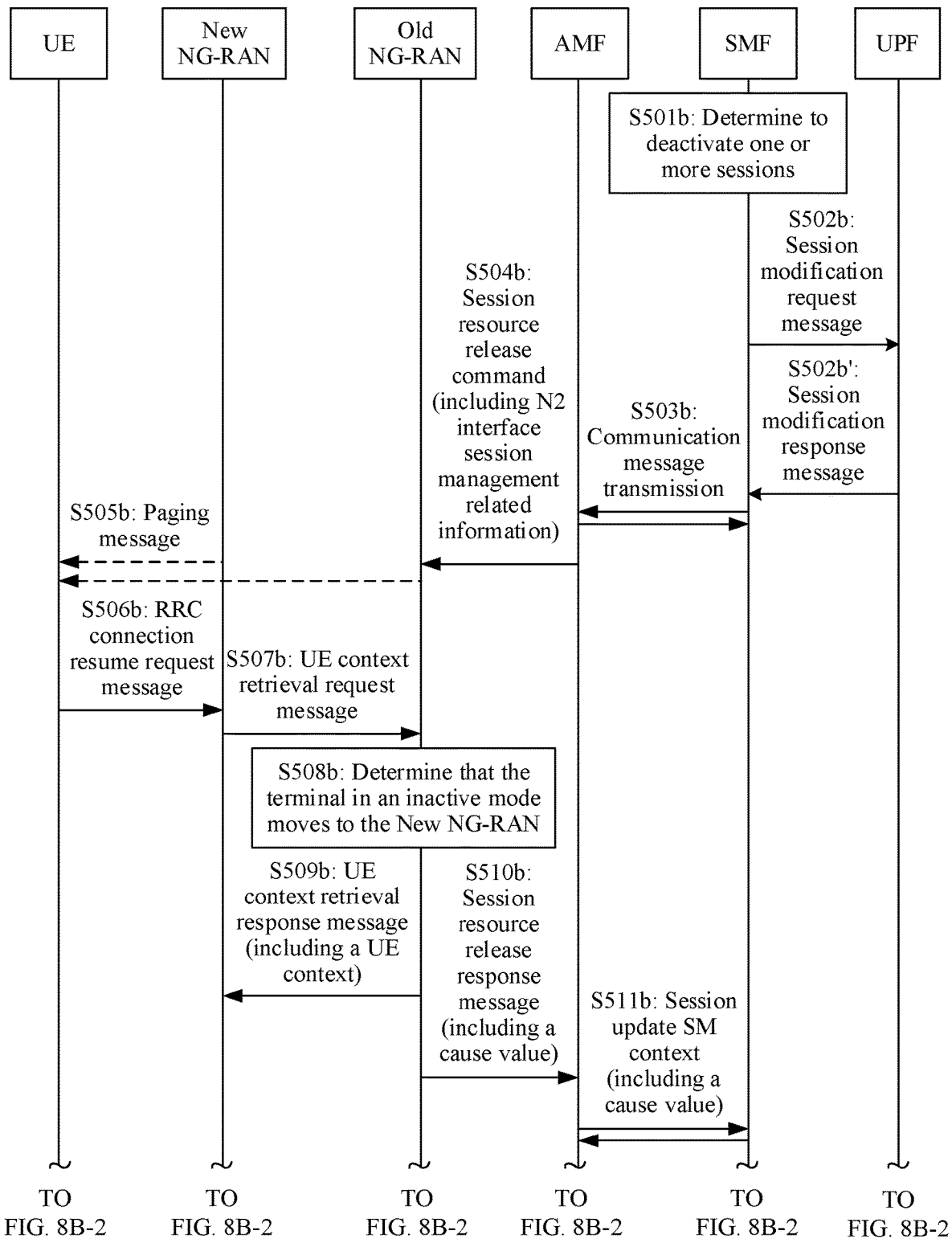
Figures 2, 8B:
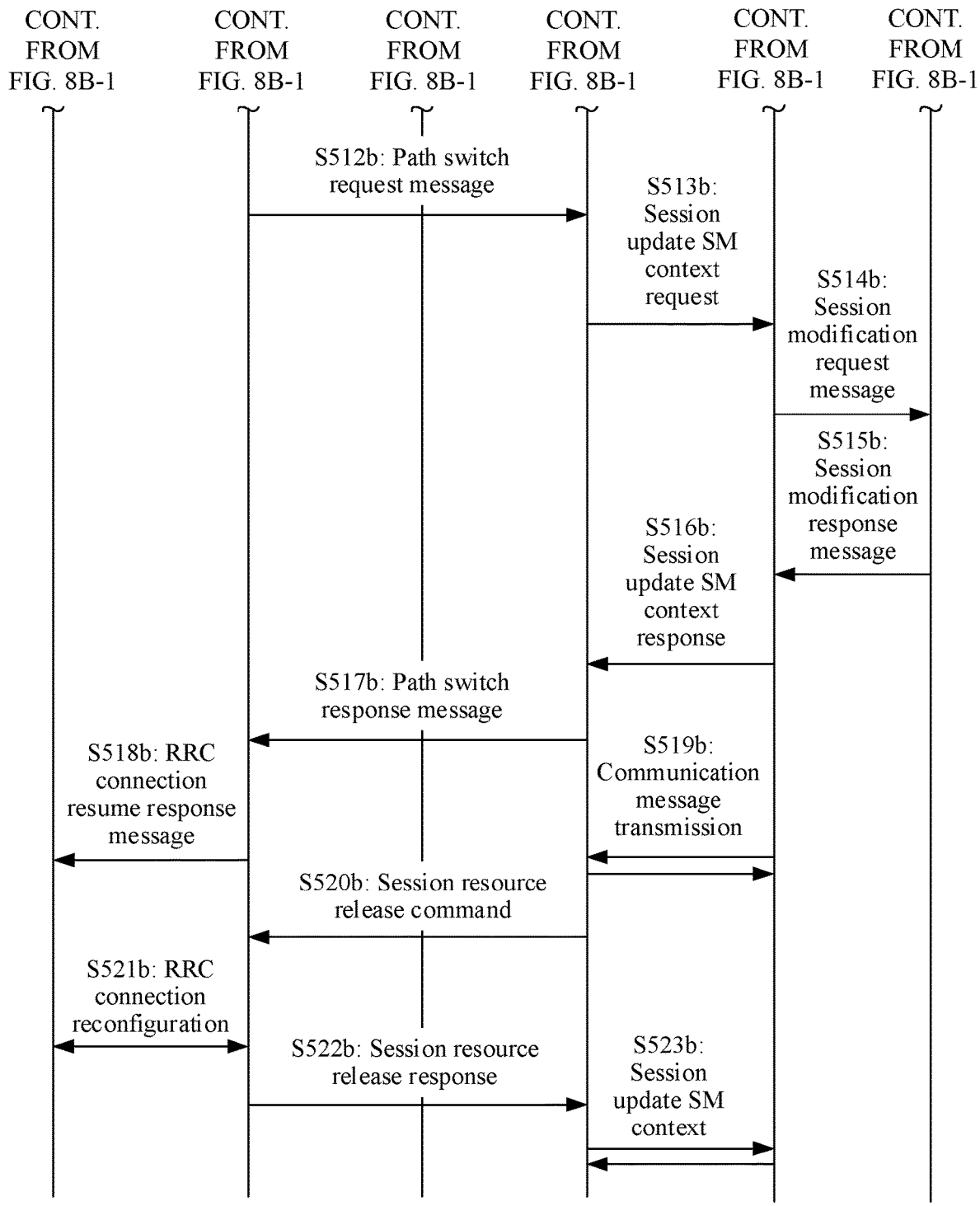

FIG. 8B-1 and FIG. 8B-2 are schematic interaction flowcharts of still another session management method according to an embodiment of this application. Application of the method in the next-generation communications system shown in FIG. 3B is used as an example. Certainly, the method may alternatively be applied to the next-generation communications system shown in FIG. 3A and another communications system. In this embodiment, a first base station is specifically an old NG-RAN, and a second base station is specifically a new NG-RAN.

A difference between this embodiment and the foregoing embodiment is as follows: After the old NG-RAN receives a UE context retrieval request message sent by the new NG-RAN, the old NG-RAN returns an N2 PDU session resource release response message to an AMF, where the response message carries a cause value, and the cause value is used to indicate that the old NG-RAN fails to release a base station resource used for the to-be-deactivated PDU session. After receiving a path switch request sent by the new NG-RAN, the AMF resends, to the new NG-RAN, an N2 PDU session resource release command carrying N2 SM info. The new NG-RAN sends a RAN-specific resource release message to UE based on the received N2 PDU session resource release command, to release the base station resource used for the to-be-deactivated PDU session.

The method may include the following steps.

S501b: A UPF sends a notification (N4 reporting) message to an SMF, to notify the SMF that no data is currently transmitted in one or more PDU sessions, and the one or more PDU sessions may be deactivated. The one or more PDU sessions are sessions corresponding to specific UE.

The SMF determines, based on the notification message, to deactivate the one or more PDU sessions.

S502b and S502b': The SMF performs a session modification (N4 session modification) procedure.

Specifically, the N4 session modification procedure mainly includes the following steps.

The SMF sends a session modification request (N4 session modification request) message to the UPF, to request to modify parameter information related to the PDU session. The parameter information related to the PDU session includes a related parameter of quality of service (QoS), a packet detection rule (PDR), a QoS flow identifier (QoSflow ID, QFI), a reflective QoS identifier (Reflective QoS ID, RQI), a RAN tunnel, and the like.

The UPF sends a session modification response (N4 session modification response) message to the SMF.

S503b: The SMF invokes an_Namf_Communication_N1N2MessageTransfer service to the AMF, where the service carries N2 SM info, and the N2 SM info includes a PDU session ID. In addition, the service may further carry a cause value, and the cause value is used to indicate the AMF to send a session resource release command (N2 PDU session resource release command) to an NG-RAN.

The N2 SM info is mainly used to create or modify a context (UE context) of the PDU session. The N2 SM info includes an identifier (PDU Session ID) of the one or more to-be-deactivated sessions of a terminal, QoS parameter information (QoS profile), N3 tunnel information (CN N3 tunnel info), and slice information (S-NSSAI).

The session resource release command may be used to indicate to release related information, for example, a DRB, corresponding to the identifier of the one or more to-be-deactivated sessions of the terminal.

S504b: The AMF sends the session resource release command (N2 PDU session resource release command) to the old NG-RAN. The command includes the N2 SM info. The old NG-RAN receives the session resource release command, and determines that the UE is currently in an RRC inactive mode. In this case, step 7 and a connection resume of the UE in the RRC inactive mode are performed.

S505b: The old NG-RAN and the new NG-RAN each send a paging message to the UE. This step is optional. Alternatively, no paging message may be sent. When the UE needs to interact with the network, the UE directly performs step S506b.

S506b: The UE sends an RRC connection resume request message to the new NG-RAN.

S507b: The new NG-RAN sends a UE context retrieval request message to the old NG-RAN.

S508b. The old NG-RAN determines that the UE in the RRC inactive mode moves to the new NG-RAN. Therefore, the old NG-RAN cannot successfully release a base station resource that is used for the to-be-deactivated PDU session and that is stored in the UE.

S509b: The old NG-RAN returns a retrieval response message to the new NG-RAN. The response carries a UE context. Before returning the retrieval response message to the new NG-RAN, the old NG-RAN determines that the UE is currently in the RRC inactive mode.

S510b: The old NG-RAN returns a terminal PDU session resource release response (N2 PDU session resource release response) message to the AMF, where the response carries a cause value used to indicate that the old NG-RAN fails to release the base station resource used for the to-be-deactivated PDU session.

S511b: The AMF invokes an Nsmf_PDUSession_UpdateSMContext service to complete acknowledgment for S403b, where the service carries a cause value used to indicate that the old NG-RAN fails to deactivate the PDU session.

There is no time sequence between step S509b and steps S510b and S511b. S509b may be performed before S510b and S511b, or S510b and S511b may be performed before S509b.

Steps S512b to S517b are a path switch (path switch) process in which the UE moves to the new NG-RAN, and specifically include the following steps.

S512b: The new NG-RAN sends an N2 path switch request message to the AMF.

The AMF receives the path switch request message.

S513b: The AMF sends a PDU session context update request (Nsmf_PDUsession_updateSMcontext request) message to the SMF. The SMF receives the context update request message.

S514b: The SMF sends an N4 session modification request message to the UPF.

The UPF receives the session modification request message.

S515b: The UPF sends an N4 session modification response message to the SMF. The SMF receives the session modification response message.

S516b: The SMF sends a PDU session context update response (Nsmf_PDUsession_updateSMcontext response) message to the AMF. The AMF receives the context update response message.

S517b: The AMF sends an N2 path switch response (N2 path switch ACK) message to the new NG-RAN. The new NG-RAN receives the path switch response message.

S518b: The new NG-RAN sends an RRC resume response to the UE.

S519b: The SMF invokes the Namf_Communication_N1N2MessageTransfer service to the AMF, where the service carries the N2 SM info, and the N2 SM info includes the PDU session ID. In addition, the service may further carry the cause value, and the cause value is used to indicate the AMF to send the session resource release command (N2 PDU session resource release command) to the NG-RAN.

The N2 SM info is mainly used to create or modify the context (UE context) of the PDU session. The N2 SM info includes the identifier (PDU Session ID) of the one or more to-be-deactivated sessions of the terminal, the QoS parameter information (QoS profile), the N3 tunnel information (CN N3 tunnel info), and the slice information (S-NSSAI).

The session resource release command may be used to indicate to release the related information, for example, the DRB, corresponding to the identifier of the one or more to-be-deactivated sessions of the terminal.

S520b: The AMF sends the session resource release command (N2 PDU session resource release command) to the new NG-RAN. The command includes the N2 SM info.

S521b: The new NG-RAN sends a base station specific resource release (RAN specific signalling exchange) message to the UE based on the received N2 SM info. The RAN specific signalling exchange message may be an RRC connection reconfiguration message, and the message is used to indicate to release the related information of the to-be-deactivated session. After completing execution based on the message, the UE returns a corresponding response to the new NG-RAN.

S522b: The new NG-RAN returns a terminal PDU session resource release (N2 PDU session resource release) response message to the AMF.

S523b: The AMF invokes the Nsmf_PDUSession_UpdateSMContext service to complete acknowledgment for S503b, to indicate that an NG-RAN resource related to the to-be-deactivated PDU session is successfully released.

Figure 9A:
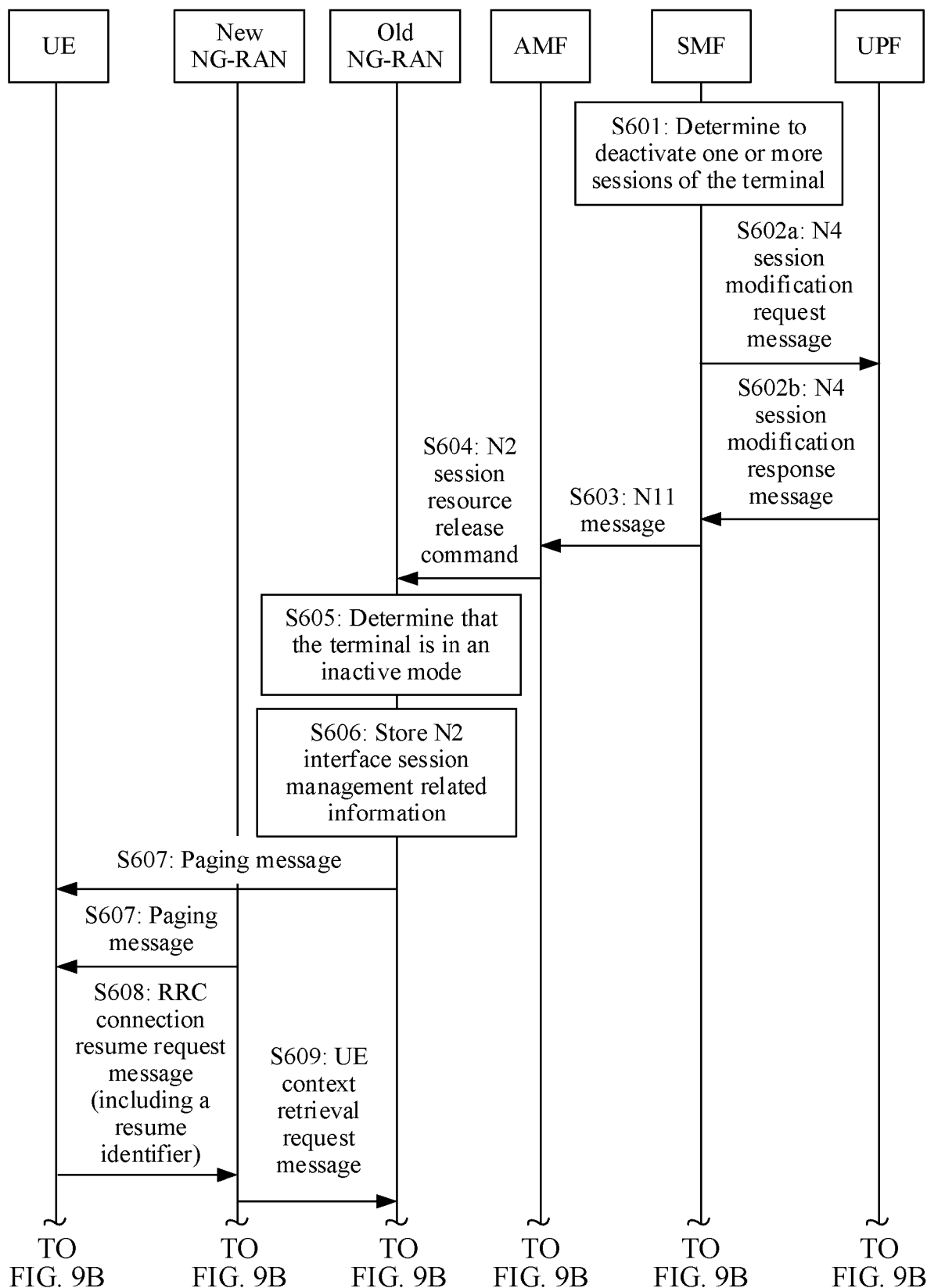
FIG. 9A and FIG. 9B are schematic interaction flowcharts of still another session management method according to an embodiment of this application.
Figure 9B:
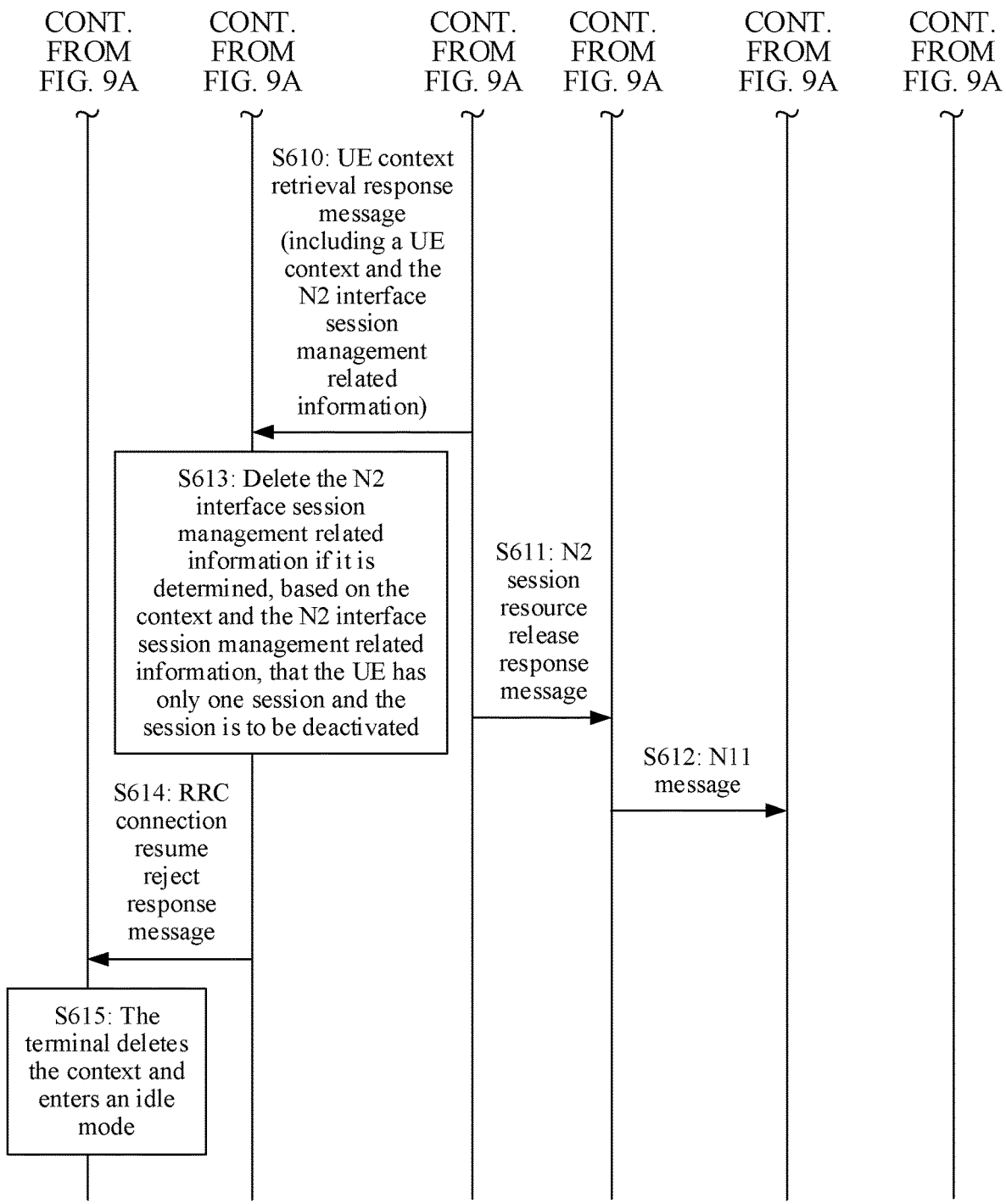

FIG. 9A and FIG. 9B are schematic interaction flowcharts of still another session management method according to an embodiment of this application. Application of the method in the next-generation communications system shown in FIG. 3A is used as an example. Certainly, the method may alternatively be applied to the next-generation communications system shown in FIG. 3B and another communications system. In this embodiment, a first base station is specifically an old NG-RAN, and a second base station is specifically a new NG-RAN. The method may include the following steps.

S601: An SMF determines to deactivate one or more PDU sessions.

S602a and S602b: The SMF performs an N4 session modification procedure.

S603: The SMF sends an N11 message to an AMF, where the message carries an N2 PDU session resource release command.

S604: The AMF sends an N2 PDU session resource release command to the old NG-RAN. The command includes N2 SM info.

S605: The old NG-RAN determines that the UE is currently in an RRC inactive mode.

S606: The old NG-RAN stores the N2 SM info.

S607: The old NG-RAN and a neighboring NG-RAN of the old NG-RAN each send a paging message to the UE.

S608: The UE sends an RRC connection resume request message to the new NG-RAN.

S609: The new NG-RAN sends a UE context retrieval request message to the old NG-RAN.

S610: The old NG-RAN returns a retrieval response message to the new NG-RAN. The response carries the N2 SM info, and may further carry a UE context.

For S601 to S610, respectively refer to S101 to S110 in the embodiment shown in FIG. 4A and FIG. 4B. Details are not described herein again.

S611: The old NG-RAN returns an N1 PDU session resource release success response message to the AMF.

S612: The AMF returns an N11 message response to the SMF.

For S611 and S612, respectively refer to S113 and S114 in the embodiment shown in FIG. 4A and FIG. 4B. Details are not described herein again.

S613: The new NG-RAN determines, based on the UE context and the N2 SM info, that the UE currently has only one PDU session and the session is to be deactivated, and then the new NG-RAN deletes the UE context.

S614: The new NG-RAN sends an RRC connection resume reject (RRC connection resume reject) response message to the UE.

S615: The UE deletes the context, and enters an idle mode.

S613 to S615 are a difference between this embodiment and the foregoing embodiment. This embodiment is a special case in which the UE has only one PDU session. If the UE has only one PDU session and the new NG-RAN determines, based on the N2 SM info, that the PDU session is to be deactivated, the new NG-RAN sends the RRC connection resume reject response message to the UE, and the UE deletes the context and enters the idle mode.

S611 and S612 may be performed in parallel with S613 to S615.

According to the session management method provided in this embodiment of this application, the network initiates a session deactivation procedure to deactivate one session of a terminal. After the terminal in an inactive mode establishes an RRC connection to the new second base station, if the second base station determines, based on a context of the terminal and N2 interface session management related information, that the terminal has only one session and the session is to be deactivated, the second base station deletes the context of the terminal, and rejects an RRC connection resume request of the terminal, so that the terminal enters an idle mode. In this way, the terminal is enabled to process related information of the to-be-deactivated session in a timely manner.

Figure 10:
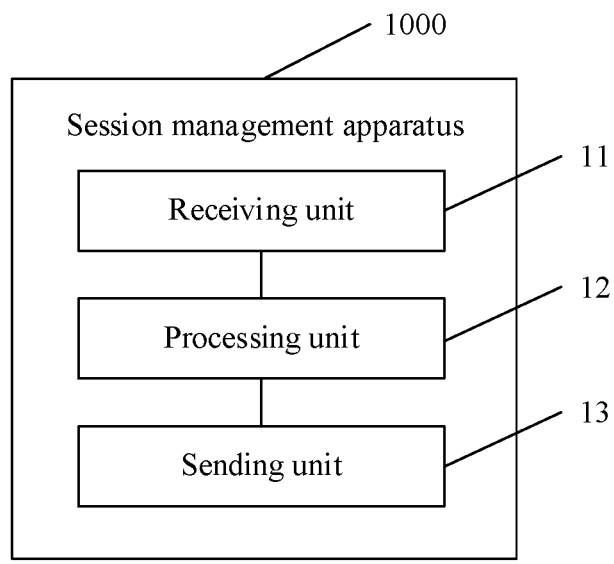
FIG. 10 is a schematic diagram of a module structure of a session management apparatus according to an embodiment of this application.

FIG. 10 is a schematic diagram of a module structure of a session management apparatus according to an embodiment of this application. The apparatus 1000 may include a receiving unit 11, a processing unit 12, and a sending unit 13.

The receiving unit 11 is configured to receive a session resource release command from an access and mobility management network element AMF, where the session resource release command includes N2 interface session management related information N2 SM info, and the N2 SM info includes an identifier of one or more to-be-deactivated sessions of a terminal.

The processing unit 12 is configured to determine that the terminal is in an inactive mode. The receiving unit is further configured to receive a context retrieval request message from a second base station.

The sending unit 13 is configured to send a context retrieval response message to the second base station, where the context retrieval response message includes the N2 SM info. The sending unit is further configured to send a session resource release success response message to the AMF.

In a possible implementation, the processing unit 12 is further configured to parse the N2 SM info, to obtain the identifier of the one or more to-be-deactivated sessions.

In another possible implementation, the sending unit 13 is further configured to send the context retrieval response message to the second base station, so that the second base station performs RRC connection reconfiguration on the terminal to reconfigure related information of the to-be-deactivated session, or the second base station sends an RRC connection resume response message to the terminal, where the RRC connection resume response message includes the identifier of the one or more to-be-deactivated sessions, and the terminal deletes session-related information corresponding to the one or more to-be-deactivated sessions.

In still another possible implementation, the processing unit 12 is further configured to delete related information of the one or more to-be-deactivated sessions from the context, where the related information includes at least the identifier of the one or more sessions and DRB information of the one or more sessions.

In still another possible implementation, the sending unit 13 is further configured to send a paging message to the terminal.

According to the session management apparatus provided in this embodiment of this application, after receiving the session resource release command from the access and mobility management function, an old first base station sends the N2 interface session management related information to the new second base station through the context response message. After the terminal in the inactive mode establishes an RRC connection to the second base station, the second base station indicates, through RRC connection reconfiguration, the terminal to delete the related information of the to-be-deactivated session, or the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

Figure 11:
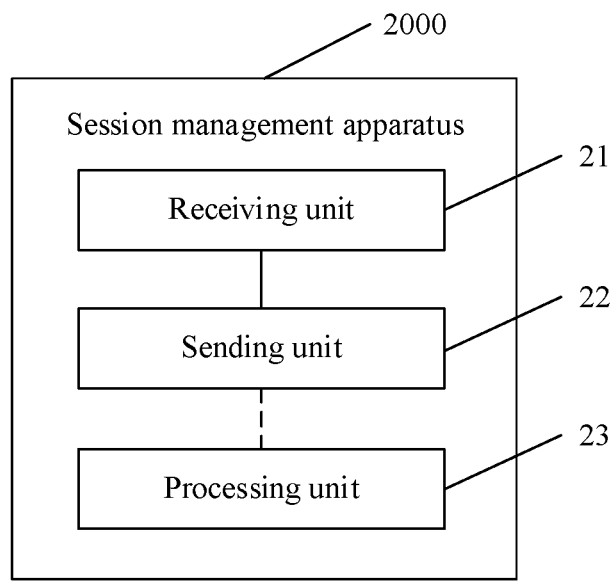
FIG. 11 is a schematic diagram of a module structure of another session management apparatus according to an embodiment of this application.

FIG. 11 is a schematic diagram of a module structure of another session management apparatus according to an embodiment of this application. The apparatus 2000 may include a receiving unit 21, a sending unit 22, and a processing unit 23.

The receiving unit 21 is configured to receive a radio resource control RRC connection resume request message from a terminal.

The sending unit 22 is configured to send a context retrieval request message to a first base station.

The receiving unit 21 is further configured to receive a context retrieval response message from the first base station, where the context retrieval response message includes N2 interface session management related information N2 SM info, and the N2 SM info includes an identifier of one or more to-be-deactivated sessions of the terminal.

The sending unit 22 is further configured to send an RRC connection resume response message to the terminal. The sending unit is further configured to send an RRC connection reconfiguration message to the terminal, where the RRC connection reconfiguration message is used to indicate to reconfigure related information of the to-be-deactivated session.

The receiving unit 21 is further configured to receive an RRC connection reconfiguration response message from the terminal.

In a possible implementation, the context retrieval response message further includes a context of the terminal, the apparatus further includes a processing unit 23, and the processing unit 23 is configured to modify the context of the terminal based on the N2 SM info, to delete the related information of the one or more to-be-deactivated sessions from the context of the terminal.

According to the session management apparatus provided in this embodiment of this application, after the terminal in an inactive mode establishes an RRC connection to a new second base station, the second base station indicates, through RRC connection reconfiguration, the terminal to delete the related information of the to-be-deactivated session. In this way, the terminal is enabled to process the related information of the to-be-deactivated session in a timely manner.

Figure 12:
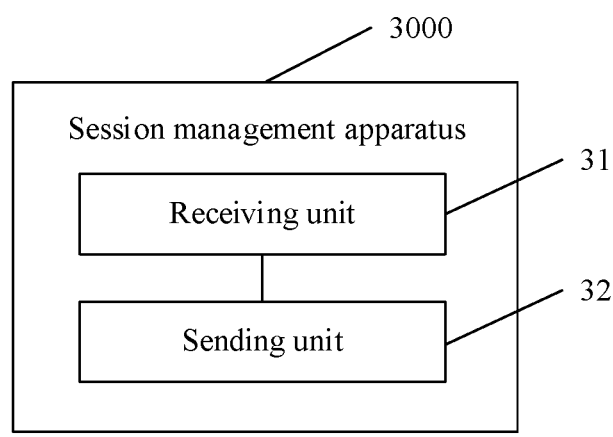
FIG. 12 is a schematic diagram of a module structure of still another session management apparatus according to an embodiment of this application.

FIG. 12 is a schematic diagram of a module structure of still another session management apparatus according to an embodiment of this application. The apparatus 3000 may include a receiving unit 31 and a sending unit 32.

The receiving unit 31 is configured to receive a radio resource control RRC connection resume request message from a terminal.

The sending unit 32 is configured to send a context retrieval request message to a first base station.

The receiving unit 31 is further configured to receive a context retrieval response message from the first base station, where the context retrieval response message includes a context of the terminal and an identifier of one or more to-be-deactivated sessions of the terminal.

The sending unit 32 is further configured to send an RRC connection resume response message to the terminal, where the RRC connection resume response message includes the identifier of the one or more to-be-deactivated sessions of the terminal.

In a possible implementation, the sending unit 32 is further configured to send the RRC connection resume response message to the terminal, so that the terminal deletes session-related information corresponding to the identifier of the one or more to-be-deactivated sessions.

In another possible implementation, the sending unit 32 is further configured to send a paging message to the terminal.

According to the session management apparatus provided in this embodiment of this application, after the terminal in an inactive mode establishes an RRC connection to a second base station, the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

Figure 13:
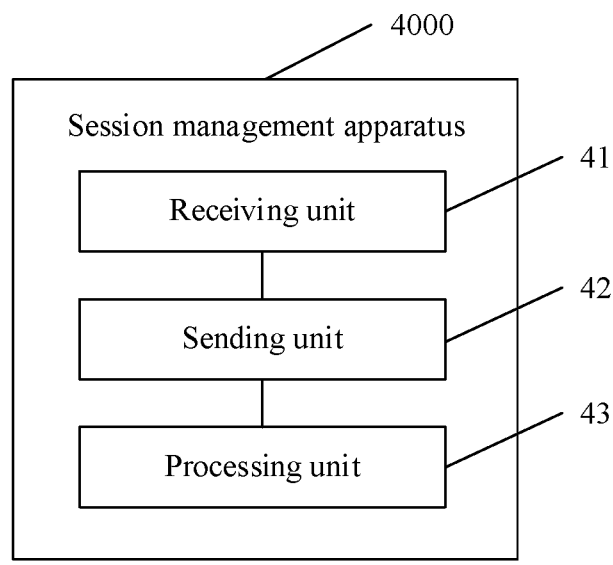
FIG. 13 is a schematic diagram of a module structure of still another session management apparatus according to an embodiment of this application.

FIG. 13 is a schematic diagram of a module structure of still another session management apparatus according to an embodiment of this application. The apparatus 4000 may include a receiving unit 41, a sending unit 42, and a processing unit 43.

The receiving unit 41 is configured to receive a paging message from each of a first base station and a second base station, where the session management apparatus is in an inactive mode.

The sending unit 42 is configured to send a radio resource control RRC connection resume request message to the second base station.

The receiving unit 41 is further configured to receive an RRC connection resume response message from the second base station, where the RRC connection resume response message includes N2 interface session management related information (N2 SM info) or an identifier of one or more to-be-deactivated sessions of the terminal, and the N2 SM info includes the identifier of the one or more to-be-deactivated sessions of the terminal.

The processing unit 43 is configured to delete session-related information corresponding to the identifier of the one or more to-be-deactivated sessions.

According to the session management apparatus provided in this embodiment of this application, after the terminal in the inactive mode establishes an RRC connection to the second base station, the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

Figure 14:
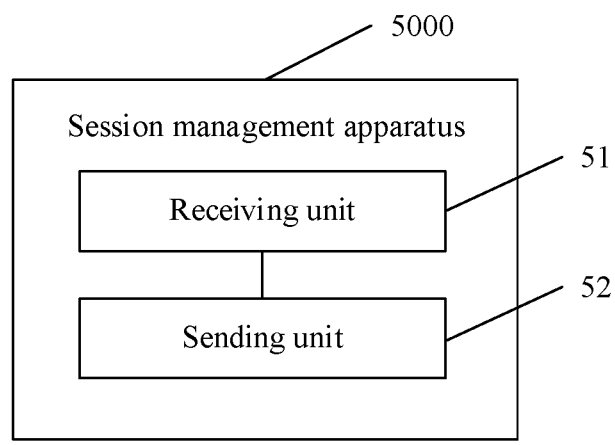
FIG. 14 is a schematic diagram of a module structure of still another session management apparatus according to an embodiment of this application.

FIG. 14 is a schematic diagram of a module structure of still another session management apparatus according to an embodiment of this application. The apparatus 5000 may include a receiving unit 51 and a sending unit 52.

The receiving unit 51 is configured to receive a paging message from each of a first base station and a second base station, where the session management apparatus is in an inactive mode.

The sending unit 52 is configured to send a radio resource control RRC connection resume request message to the second base station.

The receiving unit 51 is further configured to receive an RRC connection resume response message from the second base station.

The receiving unit 51 is further configured to receive an RRC connection reconfiguration message from the second base station, where the RRC connection reconfiguration message is used to indicate to reconfigure related information of a to-be-deactivated session.

The sending unit 53 is further configured to send an RRC connection reconfiguration response message to the second base station.

According to the session management apparatus provided in this embodiment of this application, after the terminal in the inactive mode establishes an RRC connection to the new second base station, the second base station indicates, through RRC connection reconfiguration, the terminal to delete the related information of the to-be-deactivated session. In this way, the terminal is enabled to process the related information of the to-be-deactivated session in a timely manner.

Figure 15:
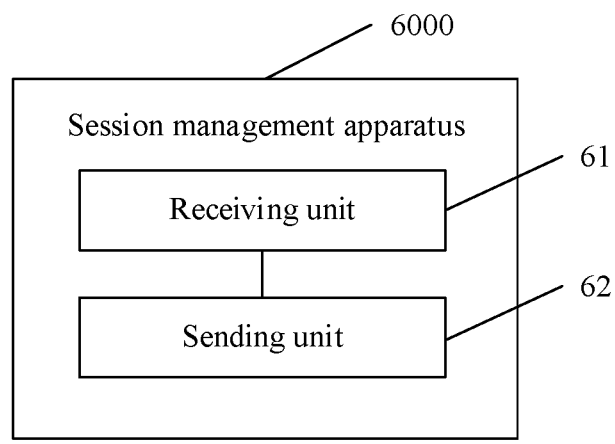
FIG. 15 is a schematic diagram of a module structure of still another session management apparatus according to an embodiment of this application.

FIG. 15 is a schematic diagram of a module structure of still another session management apparatus according to an embodiment of this application. The apparatus 6000 may include a receiving unit 61 and a sending unit 62.

The receiving unit 61 is configured to receive a radio resource control RRC connection resume request message from a terminal.

The sending unit 62 is configured to send a context retrieval request message to a first base station.

The receiving unit 61 is further configured to receive a context retrieval response from the first base station, where the context retrieval response message includes a context of the terminal.

The sending unit 62 is further configured to send an RRC connection resume response message to the terminal.

The receiving unit 61 is further configured to receive a session resource release command from an access and mobility management function, where the session resource release command includes N2 interface session management related information N2 SM info, and the N2 SM info includes an identifier of one or more to-be-deactivated sessions of the terminal.

The sending unit 62 is further configured to send an RRC connection reconfiguration message to the terminal, where the RRC connection reconfiguration message is used to indicate to reconfigure a data radio bearer DRB of the terminal and delete related information of the one or more to-be-deactivated sessions.

The receiving unit 61 is further configured to receive an RRC connection reconfiguration response message from the terminal.

The sending unit 62 is further configured to send a session resource release success response message to the access and mobility management function.

According to the session management apparatus provided in this embodiment of this application, a network initiates a session deactivation procedure to deactivate the one or more sessions of the terminal. The old first base station cannot perform RRC connection reconfiguration with the terminal to delete the related information of the one or more to-be-deactivated sessions, but returns a session resource release failure response message to the access and mobility management function. The access and mobility management function resends the session resource release command to a new second base station. The new second base station performs RRC connection reconfiguration with the terminal. In this way, the terminal is enabled to process the related information of the to-be-deactivated session in a timely manner.

Figure 16:
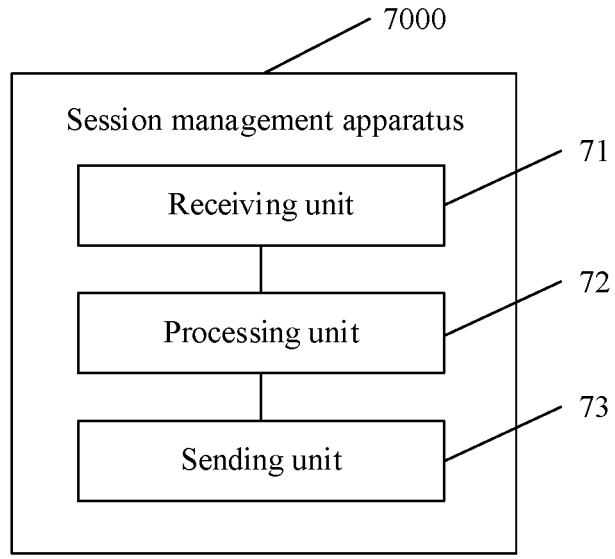
FIG. 16 is a schematic diagram of a module structure of still another session management apparatus according to an embodiment of this application.

FIG. 16 is a schematic diagram of a module structure of still another session management apparatus according to an embodiment of this application. The apparatus 7000 may include a receiving unit 71, a processing unit 72, and a sending unit 73.

The receiving unit 71 is configured to receive a session resource release command from an access and mobility management function, where the session resource release command includes N2 interface session management related information (N2 SM info), and the N2 SM info includes an identifier of one or more to-be-deactivated sessions of a terminal.

The processing unit 72 is configured to determine that the terminal is in an inactive mode.

The receiving unit 71 is further configured to receive a context retrieval request message from a second base station after the terminal sends a radio resource control RRC connection resume request message to the second base station.

The sending unit 73 is configured to send a context retrieval response message to the second base station, where the context retrieval response includes a context of the terminal.

The sending unit 73 is further configured to send a session resource release failure response message to the access and mobility management function, where the session resource release failure response message includes an identifier of the second base station.

In a possible implementation, the sending unit 73 is further configured to send the session resource release failure response message to the access and mobility management function, so that the access and mobility management function sends a session resource release command to the second base station, where the session resource release command includes the N2 SM info, the second base station sends an RRC connection reconfiguration message to the terminal, and the RRC connection reconfiguration message is used to indicate to reconfigure related information of the to-be-deactivated session.

According to the session management apparatus provided in this embodiment of this application, a network initiates a session deactivation procedure to deactivate the one or more sessions of the terminal. An old first base station cannot perform RRC connection reconfiguration with the terminal to delete the related information of the one or more to-be-deactivated sessions, but returns the session resource release failure response message to the access and mobility management function. The access and mobility management function resends the session resource release command to the new second base station. The new second base station performs RRC connection reconfiguration with the terminal. In this way, the terminal is enabled to process the related information of the to-be-deactivated session in a timely manner.

Figure 17:
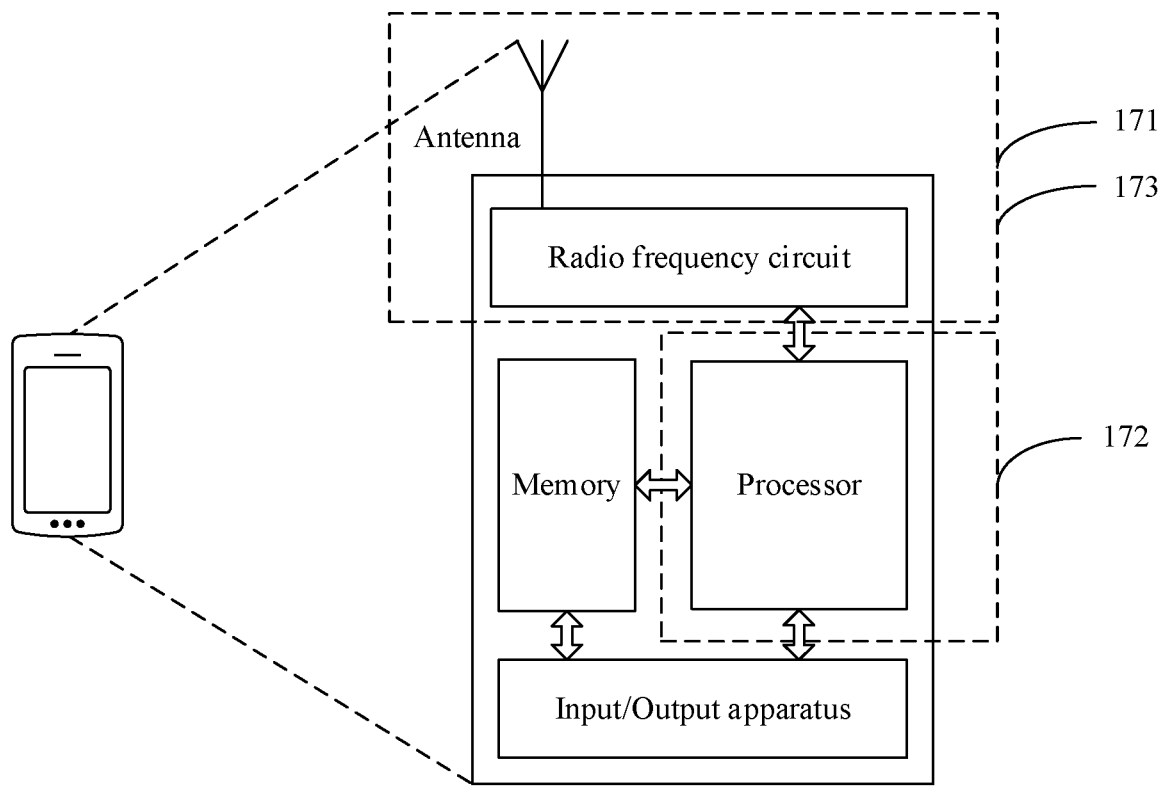
FIG. 17 is a schematic diagram of a hardware structure of a session management apparatus according to an embodiment of this application.

FIG. 17 is a schematic diagram of a simplified hardware structure of a session management apparatus according to an embodiment of the present invention. The session management apparatus may be the foregoing terminal. The session management apparatus may be configured to perform the foregoing session management method. For ease of understanding and illustration, an example in which a terminal device is a mobile phone is used in FIG. 17. As shown in FIG. 17, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 17, the terminal device includes a receiving unit 171, a processing unit 172, and a sending unit 173. The receiving unit 171 may also be referred to as a receiver, a receiving set, a receiver circuit, or the like. The sending unit 173 may also be referred to as a transmitter, a transmitting set, a sending set, a transmitter circuit, or the like. The processing unit 172 may also be referred to as a processor, a processing board, a processing module, a processing apparatus, or the like. The receiving unit 171 and the sending unit 173 may also be collectively referred to as a communications unit.

For example, in an embodiment, the receiving unit 171 is configured to receive a paging message, for example, perform S107 in the embodiment in FIG. 4A and FIG. 4B. The sending unit 173 is configured to send an RRC connection resume request message to a second base station, for example, perform S108 in the embodiment in FIG. 4A and FIG. 4B. The receiving unit 171 is further configured to receive an RRC connection resume response message from the second base station, for example, perform S111 in the embodiment in FIG. 4A and FIG. 4B. The processing unit 172 is configured to delete session-related information corresponding to an identifier of one or more to-be-deactivated PDU sessions, for example, perform S112 in the embodiment shown in FIG. 4A and FIG. 4B.

For example, in another embodiment, the receiving unit 171 is configured to receive a paging message. The sending unit 173 is configured to send an RRC connection resume request message to a second base station, for example, perform S203 in the embodiment shown in FIG. 5. The receiving unit 171 is further configured to receive an RRC connection resume response message from the second base station, for example, perform S206 in the embodiment shown in FIG. 5. The receiving unit 171 is further configured to receive an RRC connection reconfiguration message from the second base station, for example, perform S207 in the embodiment shown in FIG. 5. The sending unit 173 is further configured to send an RRC connection reconfiguration response message to the second base station, for example, perform S208 in the embodiment shown in FIG. 5.

For example, in still another embodiment, the receiving unit 171 is configured to receive a paging message, for example, perform S607 in the embodiment in FIG. 9A and FIG. 9B. The sending unit 173 is configured to send an RRC connection resume request message to a second base station, for example, perform S608 in the embodiment in FIG. 9A and FIG. 9B. The receiving unit 171 is further configured to receive an RRC connection resume reject response message from the second base station, for example, perform S614 in the embodiment in FIG. 9A and FIG. 9B. The processing unit 172 is configured to: delete a context of the terminal, and enable the terminal to enter an idle mode, for example, perform S615 in the embodiment shown in FIG. 9A and FIG. 9B.

For details, refer to the descriptions in the method embodiments.

According to the session management apparatus provided in this embodiment of the present invention, a network initiates a session deactivation procedure to deactivate the one or more sessions of the terminal. After the terminal in an inactive mode establishes an RRC connection to the new second base station, the second base station indicates, through RRC connection reconfiguration, the terminal to delete the related information of the to-be-deactivated session, or the second base station uses the RRC connection resume response message to carry the identifier of the one or more to-be-deactivated sessions, and the terminal deletes the session-related information corresponding to the identifier of the one or more to-be-deactivated sessions. In this way, the terminal is enabled to process the related information of the to-be-deactivated session in a timely manner.

Figure 18:
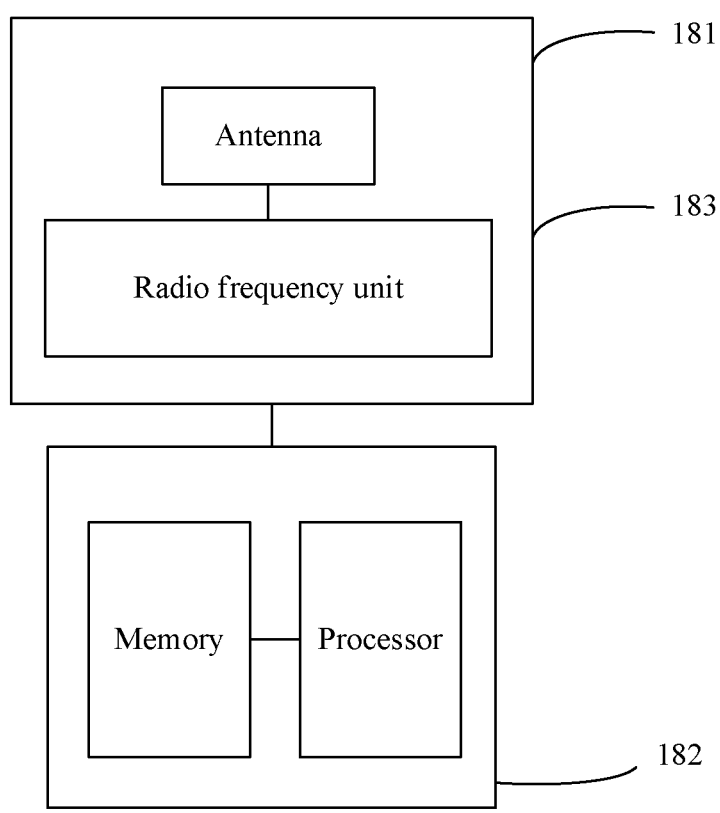
FIG. 18 is a schematic diagram of a hardware structure of another session management apparatus according to an embodiment of this application.

FIG. 18 is a schematic diagram of a simplified hardware structure of another session management apparatus according to an embodiment of the present invention. The session management apparatus may be the foregoing first base station. The session management apparatus includes a part 182 and a part for sending/receiving a radio frequency signal and performing conversion. The part for sending/receiving a radio frequency signal and performing conversion further includes a receiving unit part 181 and a sending unit part 183 (which may also be collectively referred to as a communications unit). The part for sending/receiving a radio frequency signal and performing conversion is mainly configured to: receive/send a radio frequency signal and perform conversion between a radio frequency signal and a baseband signal. The part 182 is mainly configured to: perform baseband processing, control the first base station, and the like. The receiving unit 181 may also be referred to as a receiver, a receiving set, a receiver circuit, or the like. The sending unit 183 may also be referred to as a transmitter, a transmitting set, a sending set, a transmitter circuit, or the like. The part 182 is usually a control center of the first base station, may be usually referred to as a processing unit, and is configured to control the first base station to perform the steps performed by the first base station in FIG. 4A and FIG. 4B to FIG. 9A and FIG. 9B. For details, refer to the foregoing descriptions of the related parts.

The part 182 may include one or more boards. Each board may include one or more processors and one or more memories, and the processor is configured to read and execute a program in the memory, to implement a baseband processing function and control the first base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an embodiment, the receiving unit 181 is configured to receive a session resource release command from an access and mobility management function, for example, perform S104 in the embodiment shown in FIG. 4A and FIG. 4B or S201 in the embodiment shown in FIG. 5. The part 182 is configured to determine that a terminal is in an RRC inactive mode, for example, perform S105 in the embodiment shown in FIG. 4A and FIG. 4B or S202 in the embodiment shown in FIG. 5. The sending unit 183 is configured to send a paging message to the terminal, for example, perform S107 in the embodiment shown in FIG. 4A and FIG. 4B. The receiving unit 181 is further configured to receive a context retrieval request message from a second base station, for example, perform S109 in the embodiment shown in FIG. 4A and FIG. 4B or S204 in the embodiment shown in FIG. 5. The sending unit 183 is further configured to send a context retrieval response message to the second base station, for example, perform S110 in the embodiment shown in FIG. 4A and FIG. 4B or S205 in the embodiment shown in FIG. 5. The sending unit 183 is further configured to send a session resource release response message to the access and mobility management function, for example, perform S113 in the embodiment shown in FIG. 4A and FIG. 4B or S209 in the embodiment shown in FIG. 5.

For example, in another embodiment, the receiving unit 181 is configured to receive a session resource release command from an access and mobility management function, for example, perform S604 in the embodiment shown in FIG. 9A and FIG. 9B. The part 182 is configured to determine that a terminal is in an RRC inactive mode, for example, perform S605 in the embodiment shown in FIG. 9A and FIG. 9B. The sending unit 183 is configured to send a paging message to the terminal, for example, perform S607 in the embodiment shown in FIG. 9A and FIG. 9B. The receiving unit 181 is further configured to receive a context retrieval request message from a second base station, for example, perform S609 in the embodiment shown in FIG. 9A and FIG. 9B. The sending unit 183 is further configured to send a context retrieval response message to the second base station, for example, perform S610 in the embodiment shown in FIG. 9A and FIG. 9B. The sending unit 183 is further configured to send a session resource release response message to the access and mobility management function, for example, perform S611 in the embodiment shown in FIG. 9A and FIG. 9B.

According to the session management apparatus provided in this embodiment of the present invention, a network initiates a session deactivation procedure to deactivate one or more sessions of the terminal. After the terminal in the inactive mode establishes an RRC connection to the new second base station, the second base station indicates, through RRC connection reconfiguration, the terminal to delete related information of the to-be-deactivated session, or the second base station uses an RRC connection resume response message to carry an identifier of the one or more to-be-deactivated sessions, and the terminal deletes session-related information corresponding to the identifier of the one or more to-be-deactivated sessions. In this way, the terminal is enabled to process the related information of the to-be-deactivated session in a timely manner.

Figure 19:
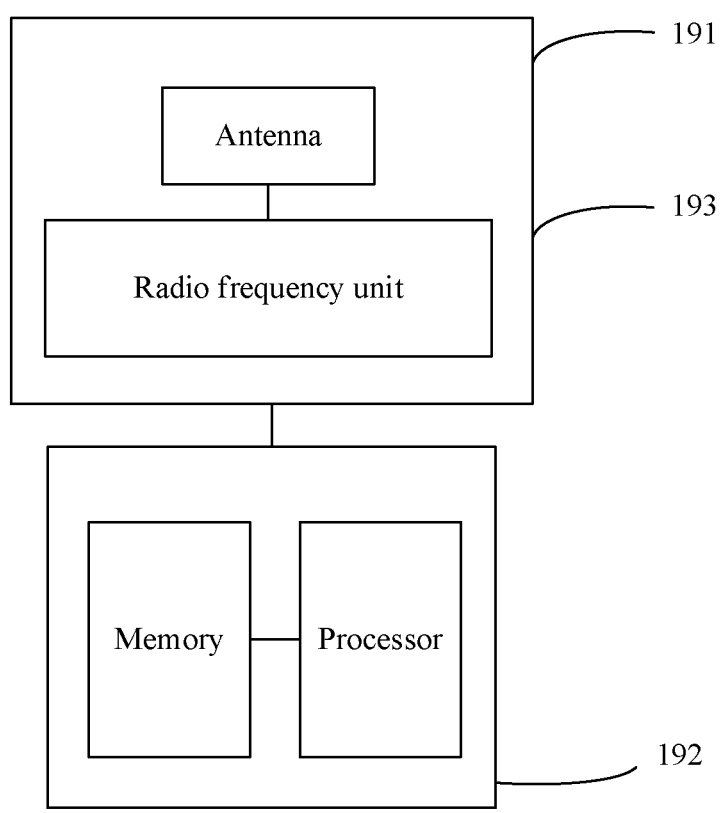
FIG. 19 is a schematic diagram of a hardware structure of still another session management element apparatus according to an embodiment of this application.

FIG. 19 is a schematic diagram of a simplified hardware structure of a session management apparatus according to an embodiment of the present invention. The session management apparatus may be the foregoing second base station.

The session management apparatus includes a part 192 and a part for sending/receiving a radio frequency signal and performing conversion. The part for sending/receiving a radio frequency signal and performing conversion further includes a receiving unit part 191 and a sending unit part 193 (which may also be collectively referred to as a communications unit). The part for sending/receiving a radio frequency signal and performing conversion is mainly configured to: receive/send a radio frequency signal and perform conversion between a radio frequency signal and a baseband signal. The part 192 is mainly configured to: perform baseband processing, control the first base station, and the like. The receiving unit 191 may also be referred to as a receiver, a receiving set, a receiver circuit, or the like. The sending unit 193 may also be referred to as a transmitter, a transmitting set, a sending set, a transmitter circuit, or the like. The part 192 is usually a control center of the first base station, may be usually referred to as a processing unit, and is configured to control the first base station to perform the steps performed by the first base station in FIG. 5. For details, refer to the foregoing descriptions of the related parts.

The part 192 may include one or more boards. Each board may include one or more processors and one or more memories, and the processor is configured to read and execute a program in the memory, to implement a baseband processing function and control the first base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an embodiment, the sending unit 193 is configured to send a paging message to a terminal, for example, perform S107 in the embodiment shown in FIG. 4A and FIG. 4B. The receiving unit 191 is configured to receive an RRC connection resume request message from the terminal, for example, perform S108 in the embodiment shown in FIG. 4A and FIG. 4B. The sending unit 193 is further configured to send a context retrieval request message to a first base station, for example, perform S109 in the embodiment shown in FIG. 4A and FIG. 4B. The receiving unit 191 is further configured to receive a context response message from the first base station, for example, perform S110 in the embodiment shown in FIG. 4A and FIG. 4B. The sending unit 193 is further configured to send an RRC connection resume response message to the terminal, for example, perform S111 in the embodiment shown in FIG. 4A and FIG. 4B.

For example, in another embodiment, the sending unit 193 is configured to send a paging message to a terminal. The receiving unit 191 is configured to receive an RRC connection resume request message from the terminal, for example, perform S203 in the embodiment shown in FIG. 5. The sending unit 193 is further configured to send a context retrieval request message to a first base station, for example, perform S204 in the embodiment shown in FIG. 5. The receiving unit 191 is further configured to receive a context response message from the first base station, for example, perform S205 in the embodiment shown in FIG. 5. The sending unit 193 is further configured to send an RRC connection resume response message to the terminal, for example, perform S206 in the embodiment shown in FIG. 5. The sending unit 193 is further configured to send an RRC connection reconfiguration message to the terminal, for example, perform S207 in the embodiment shown in FIG. 5. The receiving unit 191 is further configured to receive an RRC connection reconfiguration response message from the terminal, for example, perform S208 in the embodiment shown in FIG. 5.

For example, in still another embodiment, the sending unit 193 is configured to send a paging message to a terminal, for example, perform S607 in the embodiment shown in FIG. 9A and FIG. 9B. The receiving unit 191 is configured to receive an RRC connection resume request message from the terminal, for example, perform S608 in the embodiment shown in FIG. 9A and FIG. 9B. The sending unit 193 is further configured to send a context retrieval request message to a first base station, for example, perform S609 in the embodiment shown in FIG. 9A and FIG. 9B. The receiving unit 191 is further configured to receive a context response message from the first base station, for example, perform S610 in the embodiment shown in FIG. 9A and FIG. 9B. The sending unit 193 is further configured to send an RRC connection resume reject response message to the terminal, for example, perform S614 in the embodiment shown in FIG. 9A and FIG. 9B.

According to the session management apparatus provided in this embodiment of the present invention, a network initiates a session deactivation procedure to deactivate one or more sessions of the terminal. After the terminal in an inactive mode establishes an RRC connection to the new second base station, the second base station indicates, through RRC connection reconfiguration, the terminal to delete related information of the to-be-deactivated session, or the second base station uses the RRC connection resume response message to carry an identifier of the one or more to-be-deactivated sessions, and the terminal deletes session-related information corresponding to the identifier of the one or more to-be-deactivated sessions. In this way, the terminal is enabled to process the related information of the to-be-deactivated session in a timely manner.

An embodiment of this application further provides a communications system, including a first base station, a second base station, and a terminal. The first base station is configured to receive a session resource release command from an access and mobility management network element AMF, where the session resource release command includes N2 interface session management related information (N2 SM info), and the N2 SM info includes an identifier of one or more to-be-deactivated sessions of the terminal. The first base station is further configured to determine that the terminal is in an inactive mode. The terminal is configured to receive a paging message. The terminal is further configured to send a radio resource control RRC connection resume request message to the second base station. The second base station is configured to send a context retrieval request message to the first base station. The first base station is further configured to send a context retrieval response message to the second base station, where the context retrieval response message includes a context of the terminal and the N2 SM info. The second base station is further configured to send an RRC connection resume response message to the terminal, where the RRC connection resume response message includes the identifier of the one or more to-be-deactivated sessions. The terminal is further configured to delete session-related information corresponding to the identifier of the one or more to-be-deactivated sessions. The first base station is further configured to send a session resource release success response message to the access and mobility management function.

In a possible implementation, the first base station is further configured to modify the context of the terminal based on the N2 SM info, to delete the related information of the one or more to-be-deactivated sessions from the context of the terminal.

In another possible implementation, the second base station is further configured to modify the context of the terminal based on the N2 SM info, to delete the related information of the one or more to-be-deactivated sessions from the context of the terminal.

An embodiment of this application further provides another communications system, including a first base station and a second base station. The first base station is configured to receive a session resource release command from an access and mobility management network element AMF, where the session resource release command includes N2 interface session management related information (N2 SM info), and the N2 SM info includes an identifier of one or more to-be-deactivated sessions of a terminal. The first base station is further configured to determine that the terminal is in an inactive mode. The second base station is configured to receive a radio resource control RRC connection resume request message sent by the terminal. The second base station is further configured to send a context retrieval request message to the first base station. The first base station is further configured to send a context retrieval response message to the second base station, where the context retrieval response message includes a context of the terminal and the N2 SM info. The second base station is further configured to send an RRC connection resume response message to the terminal. The second base station is further configured to send an RRC connection reconfiguration message to the terminal, where the RRC connection reconfiguration message is used to indicate to reconfigure related information of the to-be-deactivated session. The second base station is further configured to receive an RRC connection reconfiguration response message sent by the terminal. The first base station is further configured to send a session resource release success response message to the AMF.

In a possible implementation, the first base station is further configured to modify the context of the terminal based on the N2 SM info, to delete the related information of the one or more to-be-deactivated sessions from the context of the terminal.

In another possible implementation, the second base station is further configured to modify the context of the terminal based on the N2 SM info, to delete the related information of the one or more to-be-deactivated sessions from the context of the terminal.

An embodiment of this application further provides still another communications system, including a first base station and a second base station. The first base station is configured to receive a session resource release command from an access and mobility management function, where the session resource release command includes N2 interface session management related information (N2 SM info), and the N2 SM info includes an identifier of one or more to-be-deactivated sessions of a terminal. The first base station is further configured to determine that the terminal is in an inactive mode. The second base station is configured to receive a radio resource control RRC connection resume request message from the terminal. The second base station is further configured to send a context retrieval request message to the first base station. The first base station is further configured to send a context retrieval response message to the second base station, where the context retrieval response message includes a context of the terminal. The first base station is further configured to send a session resource release failure response message to the access and mobility management function, where the session resource release failure response message includes an identifier of the second base station. The second base station is further configured to send an RRC connection resume response message to the terminal. The second base station is further configured to receive a session resource release command from the access and mobility management function, where the session resource release command includes the N2 SM info. The second base station is further configured to send an RRC connection reconfiguration message to the terminal, where the RRC connection reconfiguration message is used to indicate to reconfigure related information of the to-be-deactivated session. The second base station is further configured to receive an RRC connection reconfiguration response message from the terminal. The second base station is further configured to send a session resource release success response message to the access and mobility management function.

An embodiment of this application further provides a computer readable storage medium. The computer readable storage medium stores an instruction, and when the instruction is run on a computer, the computer is enabled to perform the methods in the foregoing aspects.

An embodiment of this application further provides a program. When being executed by a processor, the program is used to perform the methods in the foregoing aspects.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer readable storage medium or may be transmitted by using a computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (solid state disk, SSD)), or the like.

A person of ordinary skill in the art may understand that all or some of the processes of the methods in the embodiments may be implemented by a computer program instructing relevant hardware. The program may be stored in a computer readable storage medium. When the program is executed, the procedures of the methods in the embodiments are performed. The foregoing storage medium includes any medium that can store program code, such as a read-only memory (ROM), a random access memory (RAM), a magnetic disk, or an optical disc.

What is claimed is:

1. A method, comprising:
   receiving, by a first base station, a session resource release command from an access and mobility management network element (AMF), wherein the session resource release command comprises N2 interface session management related information (N2 SM info), and the N2 SM info comprises an identifier of one or more to-be-deactivated sessions of a terminal;
   determining, by the first base station, that the terminal is in an inactive mode;
   receiving, by the first base station, a context retrieval request message from a second base station;
   sending, by the first base station, a context retrieval response message to the second base station, wherein the context retrieval response message comprises the N2 SM info; and
   sending, by the first base station, a session resource release success response message to the AMF.
2. The method according to claim 1, wherein before the sending, by the first base station, the context retrieval response message to the second base station, the method further comprises:
   parsing, by the first base station, the N2 SM info, to obtain the identifier of the one or more to-be-deactivated sessions.
3. The method according to claim 2, wherein the sending, by the first base station, the context retrieval response message to the second base station comprises:
   sending, by the first base station, the context retrieval response message to the second base station, so that:
      the second base station performs radio resource control (RRC) connection reconfiguration on the terminal to reconfigure related information of the to-be-deactivated session, or
      the second base station sends an RRC connection resume response message to the terminal;
   wherein the RRC connection resume response message comprises the identifier of the one or more to-be-deactivated sessions, and the terminal deletes session-related information corresponding to the one or more to-be-deactivated sessions.
4. The method according to claim 1, wherein before the sending, by the first base station, the context retrieval response message to the second base station, the method further comprises:
   deleting, by the first base station, related information of the one or more to-be-deactivated sessions from the context, wherein the related information comprises at least the identifier of the one or more sessions and data radio bearer (DRB) information of the one or more sessions.
5. The method according to claim 1, wherein before the receiving, by the first base station, the context retrieval request message from the second base station, the method further comprises:
   sending, by the first base station, a paging message to the terminal.
6. The method of claim 1, wherein the first base is an old NG-RAN and the second base station is a new NG-RAN.
7. A session management method, comprising:
   receiving, by a second base station, a radio resource control (RRC) connection resume request message from a terminal;
   sending, by the second base station, a context retrieval request message to a first base station;
   receiving, by the second base station, a context retrieval response message from the first base station, wherein the context retrieval response message comprises N2 interface session management related information (N2 SM info), and the N2 SM info comprises an identifier of one or more to-be-deactivated sessions of the terminal;
   sending, by the second base station, an RRC connection resume response message to the terminal;
   sending, by the second base station, an RRC connection reconfiguration message to the terminal, wherein the RRC connection reconfiguration message is used to indicate to reconfigure related information of the to-be-deactivated session; and
   receiving, by the second base station, an RRC connection reconfiguration response message from the terminal.
8. The method according to claim 7, wherein the context retrieval response message further comprises a context of the terminal, and after the receiving, by the second base station, the context retrieval response message from the first base station, the method further comprises:
   modifying, by the second base station, the context of the terminal based on the N2 SM info, to delete the related information of the one or more to-be-deactivated sessions from the context of the terminal.

9. The method according to claim 7, wherein after the receiving, by the second base station, the context retrieval response message from the first base station, the method further comprises:

sending, by the second base station, a path switch request message to an access and mobility management network element AMF; and receiving, by the second base station, a path switch response message from the AMF.

10. The method according to claim 9, wherein after the sending, by the second base station, the RRC connection reconfiguration message to the terminal, the method further comprises:

sending, by the second base station, a session resource release response message to the AMF.

11. The method of claim 7, wherein the first base is an old NG-RAN and the second base station is a new NG-RAN.

12. A session management method, comprising:

receiving, by a terminal, a paging message from each of a first base station and a second base station, wherein the terminal is in an inactive mode;

sending, by the terminal, a radio resource control (RRC) connection resume request message to the second base station;

receiving, by the terminal, an RRC connection resume response message from the second base station, wherein the RRC connection resume response message comprises N2 interface session management related information (N2 SM info) or an identifier of one or more to-be-deactivated sessions of the terminal, and the N2 SM info comprises the identifier of the one or more to-be-deactivated sessions of the terminal; and deleting, by the terminal, session-related information corresponding to the identifier of the one or more to-be-deactivated sessions.

13. The method of claim 12, wherein the first base is an old NG-RAN and the second base station is a new NG-RAN.

* * * * *